United States Patent
Krapf et al.

(10) Patent No.: US 10,444,401 B2
(45) Date of Patent: Oct. 15, 2019

(54) LOCATING SYSTEM COMPRISING A HAND-HELD LOCATING DEVICE, AND LOCATING METHOD

(71) Applicant: Robert Bosch GmbH, Stuttgart (DE)

(72) Inventors: Reiner Krapf, Filderstadt (DE); Heiko Sgarz, Leonberg (DE); Carina Schmidt-Knorreck, Kernen (DE)

(73) Assignee: Robert Bosch GmbH, Stuttgart (DE)

( * ) Notice: Subject to any disclaimer, the term of this patent is extended or adjusted under 35 U.S.C. 154(b) by 383 days.

(21) Appl. No.: 15/320,814

(22) PCT Filed: Jun. 25, 2015

(86) PCT No.: PCT/EP2015/064451
§ 371 (c)(1),
(2) Date: Dec. 21, 2016

(87) PCT Pub. No.: WO2015/197790
PCT Pub. Date: Dec. 30, 2015

(65) Prior Publication Data
US 2017/0153350 A1 Jun. 1, 2017

(30) Foreign Application Priority Data

Jun. 25, 2014 (DE) .................. 10 2014 212 131

(51) Int. Cl.
*G01V 9/00* (2006.01)
*G01C 15/02* (2006.01)
(Continued)

(52) U.S. Cl.
CPC ............... *G01V 9/00* (2013.01); *G01C 15/02* (2013.01); *G01V 3/10* (2013.01); *G01V 3/17* (2013.01);
(Continued)

(58) Field of Classification Search
CPC ........... G06T 1/00; G06T 220/00; A61B 1/00; G06N 3/00; G06F 1/00; G06F 2101/00
See application file for complete search history.

(56) References Cited

U.S. PATENT DOCUMENTS

2004/0236206 A1* 11/2004 Sakas ..................... A61B 8/00
                                                                     600/407
2005/0280425 A1    12/2005 Murray
                           (Continued)

FOREIGN PATENT DOCUMENTS

CN    101460870 A    6/2009
CN    102246061 A    11/2011
                     (Continued)

OTHER PUBLICATIONS

International Search Report corresponding to PCT Application No. PCT/EP2015/064451, dated Feb. 23, 2016 (German and English language document) (9 pages).

*Primary Examiner* — Jermele M Hollington
*Assistant Examiner* — Temilade S Rhodes-Vivour
(74) *Attorney, Agent, or Firm* — Maginot, Moore & Beck LLP

(57) ABSTRACT

A hand-held locating apparatus comprises at least one hand-held locating device for acquiring locating data on objects that are hidden below a surveyed surface and are to be located, and comprises a position sensor for sensing position data of the locating device in relation to the surveyed surface. The locating system includes at least one evaluation device for determining directionally and/or spatially resolved location information from the locating data in a first mode of operation of the locating system without repositioning the locating device in relation to the surveyed surface and for determining at least three-dimensional locating information from the locating data and the position data by assigning locating data to position data in a second mode of operation. Also disclosed is a method for locating objects hidden below a surveyed surface, wherein the at least two modes of operation of the locating system can be selected.

18 Claims, 9 Drawing Sheets

(51) Int. Cl.
*G01V 3/17* (2006.01)
*G01V 3/175* (2006.01)
*G01V 8/00* (2006.01)
*G01V 3/10* (2006.01)
*G06K 9/22* (2006.01)
*G06T 11/60* (2006.01)
*G06F 1/00* (2006.01)
*G01V 3/15* (2006.01)

(52) U.S. Cl.
CPC .............. *G01V 3/175* (2013.01); *G01V 8/005* (2013.01); *G06K 9/22* (2013.01); *G06T 11/60* (2013.01); *G01V 3/15* (2013.01); *G06F 1/00* (2013.01); *G06F 2101/00* (2013.01); *G06K 2207/00* (2013.01); *G06K 2209/09* (2013.01)

(56) References Cited

U.S. PATENT DOCUMENTS

| | | | |
|---|---|---|---|
| 2010/0097212 A1 | 4/2010 | Wingate et al. | |
| 2011/0243476 A1* | 10/2011 | Sieracki | G01V 3/15 382/291 |
| 2013/0070068 A1* | 3/2013 | Garvey, III | G01C 15/00 348/61 |
| 2013/0179123 A1* | 7/2013 | Krapf | G01V 3/15 702/187 |
| 2013/0182167 A1 | 7/2013 | Haldner et al. | |
| 2014/0166740 A1* | 6/2014 | Everth | G01S 5/16 235/375 |

FOREIGN PATENT DOCUMENTS

| | | |
|---|---|---|
| CN | 103513282 A | 1/2014 |
| DE | 10 2006 025 861 A1 | 12/2007 |
| DE | 10 2006 000 364 A1 | 1/2008 |
| DE | 10 2008 054 460 A1 | 6/2010 |
| DE | 20 2010 016 564 U1 | 3/2011 |
| DE | 10 2011 079 258 A1 | 1/2013 |
| DE | 10 2012 204 580 A1 | 9/2013 |
| EP | 2 182 390 A2 | 5/2010 |
| EP | 2 302 417 A2 | 3/2011 |
| EP | 2 680 044 A2 | 1/2014 |
| JP | 2003-98263 A | 4/2003 |
| JP | 2005-518549 A | 6/2005 |
| JP | 2006-64420 A | 3/2006 |
| JP | 2008-232803 A | 10/2008 |
| JP | 2012-506055 A | 3/2012 |
| WO | 03/073133 A1 | 9/2003 |

\* cited by examiner

LOCATING SYSTEM COMPRISING A HAND-HELD LOCATING DEVICE, AND LOCATING METHOD

This application is a 35 U.S.C. § 371 National Stage Application of PCT/EP2015/064451, filed on Jun. 25, 2015, which claims the benefit of priority to Serial No. DE 10 2014 212 131.0, filed on Jun. 25, 2014 in Germany, the disclosures of which are incorporated herein by reference in their entirety.

BACKGROUND

DE 10 2006 025 861 A1 has already proposed a locating appliance for locating objects in an examination article, said locating appliance being provided in conjunction with an output unit for outputting an information item on the basis of a movement characteristic.

SUMMARY

The disclosure proceeds from a locating system, in particular a hand-held locating appliance, at least comprising a hand-held locating apparatus provided to capture locating data in relation to objects to be located which are concealed under an examination surface, comprising a position sensor for capturing position data of the locating apparatus in relation to the examination surface.

What is proposed is that the locating system has at least one evaluation apparatus which is configured at least to determine and/or provide a direction-resolved and/or spatially resolved locating information item from the locating data without repositioning the locating apparatus in relation to the examination surface in a first mode of operation of the locating system and determine an at least three-dimensional locating information item from the locating data and the position data by assigning locating data to position data in a second mode of operation.

The locating system, preferably the hand-held locating appliance, has at least one hand-held locating apparatus provided to capture locating data in relation to objects to be located which are concealed under an examination surface. A locating apparatus should be understood to mean, in particular, an apparatus which has means which are provided to capture physical and/or chemical variables, which allow the presence of an object to be located to be deduced, and convert these variables into an electrically evaluable signal. In particular, the locating apparatus includes the components, electrical circuits and the like required for operating the means. The locating apparatus serves to locate objects to be located which are concealed under an examination surface. Preferably, there is no need for an, in particular direct, tactile contact between the locating apparatus and an object to be located during the locating process. Preferably, the locating apparatus has at least one locating sensor for carrying out the locating process. As a matter of principle, locating sensors are suitable to detect objects to be located which are concealed in an examination article, for example by evaluating an electric and/or magnetic field change or a change in the time-of-flight of the radiation emitted into a material to be examined. Preferably, the locating apparatus may have e.g. an inductive sensor, an AC sensor, a capacitive sensor or the like. Likewise, sensors provided for capture by means of electromagnetic radiation, such as, in particular, a 50 Hz sensor, a microwave sensor, a radar sensor, a terahertz sensor, an ultrahigh frequency sensor, an x-ray sensor, an infrared sensor or an NMR sensor, are also suitable. Furthermore, sound sensors, e.g. ultrasonic sensors or impact echo sensors, or neutron probes are conceivable as locating sensors. Preferably, a combination of a plurality of locating sensors, in particular also of different types of locating sensors, is also conceivable for carrying out the locating process.

In particular, "provided" should be understood to mean, specifically, "programmed", "configured" and/or "equipped". An object being "provided" for a specific function should be understood to mean, in particular, that the object fulfills and/or carries out this specific function in at least one application and/or operating state, or it is configured to fulfill the function.

A hand-held locating apparatus should be understood to mean, in particular, that the locating apparatus of the locating system may be transported without the aid of a transport appliance and by using only the hands, in particular one hand. In particular, the locating apparatus may be guided in a hand-held manner over the examination surface, even during a measuring process with a movement freely carried out by a user of the locating system, in particular a movement carried out freely along two directions. The mass of the hand-held locating apparatus is less than 5 kg in particular, advantageously less than 3 kg and particularly advantageously less than 1 kg. Preferably, the hand-held locating apparatus has a housing with a handle or handle region, by means of which the locating apparatus may be guided over the examination surface of the article to be examined. Preferably, the locating sensor is embodied as part of the hand-held locating apparatus. Furthermore, the locating apparatus comprises a position sensor. Preferably, locating sensor and position sensor are housed in the housing of the hand-held locating apparatus.

A free movement should be understood to mean, in particular, a movement which is independent of a predetermined grid or a predetermined track for the repositioning of the locating apparatus, in particular for a movement or a travel.

Particularly preferably, a hand-held locating appliance may be realized, which comprises a housing which receives at least the essential functional components of the locating system. In particular, the housing receives at least a control apparatus, a locating apparatus with locating sensor, a position sensor, an evaluation apparatus, an input and/or output apparatus, a display apparatus in particular, and also an energy supply apparatus. In particular, in terms of the overall volume thereof, more than 50%, preferably more than 75%, particularly preferably 100% of the components are housed in the housing of the locating appliance. Preferably, the hand-held locating appliance may have a handle or handle region, by means of which the locating appliance may be guided over the examination surface of the article to be examined. The mass of the hand-held locating appliance is less than 5 kg in particular, advantageously less than 3 kg and particularly advantageously less than 1 kg. In this way, it is possible to realize a particularly compact locating system in the form of a locating appliance that is easily guidable by a user in one hand. Furthermore, this allows the components of the locating system to be advantageously protected by a housing of the locating appliance against damage and environmental influences, for example against the ingress of moisture and dust.

Such a hand-held locating appliance represents a preferred embodiment of the locating system according to the disclosure. Therefore, (hand-held) locating appliance and locating system are used largely synonymously below. However, it should be noted that the teaching according to the disclosure may also be transferred to non-hand-held locating systems.

Locating data should, in particular, be understood to mean measured values and/or measurement signals of the locating apparatus, in particular measured values and/or measurement signals of at least one locating sensor. By way of example, such measured values and/or measurement signals may relate to measured amplitudes, phase angles, direction information items, signal strengths, relaxation times or the like.

An examination surface should be understood to mean, in particular, a surface of an article or workpiece to be examined in respect of concealed objects to be located. By way of example, and not exhaustively, the workpiece may be building materials, a wall, a floor, a ceiling, screed, an organic entity (in particular parts of a body as well) and/or parts of a terrain. By way of example, the article or the workpiece may consist of, in particular, wood, glass, plastic, cement, stone, brick, gypsum, metal, organic materials or the like. Moreover, in principle, it is also possible to examine liquids. Exemplary objects to be located are represented by inclusions of a material, which differs from the material of the article to be examined or the physical properties of which differ from those of the material of the article to be examined. Typical examples of such objects to be located are power lines, pipes, gas lines, cavities, reinforcements or the like, which are concealed in a building wall.

The locating system, preferably the hand-held locating appliance, further comprises a position sensor for detecting position data of the locating apparatus in relation to the examination surface. In particular, a position sensor should be understood to mean a sensor provided to convert a change in field, a change in time-of-flight and/or a phase angle into an electrically evaluable signal and output or transmit a current position of the position sensor on the examination surface. Here, the current position may be captured relative to an earlier position or in absolute terms, in particular in relation to at least one fixed reference point, and output or transmitted as position data. Furthermore, the position sensor may preferably also determine an alignment of the position sensor and hence of the locating apparatus. The position data at least relate to coordinates in two directions, which determine the position of the position sensor on the examination surface. Furthermore, position data may also determine an alignment of the position sensor in relation to the examination surface.

A reference point should be understood to mean a point which is fixedly arranged relative to the examination surface, for example a point fixed by a marking element of the locating system or a prominent point at a transition from the examination surface to another building partial surface. By way of example, such a reference point may be defined at an edge formed by a floor and a wall. Furthermore, it is conceivable for the position sensor to be provided to determine a position by means of an external reference, for example stationary transmitters and/or satellites. Alternatively, it is furthermore conceivable for the position sensor to be provided to capture position data for a locating process in a purely relative manner, independently of a reference point on the examination surface.

By way of example, the position sensor is embodied as an optical or mechanical displacement sensor which, in one operating state, captures a movement and/or rotation of the locating apparatus on the examination surface. In a preferred embodiment, the position sensor is preferably realized as an optical displacement transducer. Preferably, the optical displacement transducer is arranged in the housing side of the locating apparatus and/or of the locating appliance facing the examination surface when the locating apparatus is applied. By using an optical displacement transducer, it is advantageously possible to minimize the distance between the locating apparatus and the examination surface in order to increase the locating depth of the locating apparatus. In an alternative or additional embodiment of the position sensor, the latter may, in particular, also be provided outside of the housing of the locating apparatus.

The position sensor may likewise be embodied as a distance sensor and provided for a distance measurement to at least one reference point by means of electromagnetic radiation, for example laser light, infrared waves or radar waves. Furthermore, the position sensor may also be based on another measurement method appearing expedient to a person skilled in the art, for example with a configuration as an ultrasonic sensor, a barometric sensor or a GPS sensor. In particular, the position sensor may further have one or more sensors from a group of sensors which comprises at least inclination sensors, angle sensors, distance sensors, translation sensors, acceleration sensors and rotational-rate-sensitive sensors.

Furthermore, provision may preferably be made of a separate sensor, and/or a sensor integrated into the position sensor, for capturing a current alignment of the locating apparatus, in particular in relation to the examination surface. By way of example, provision may be made of an inertial sensor system, by means of which a rotation of the locating apparatus in any direction may be detected and evaluated quantitatively.

Furthermore, the position sensor may also comprise at least one camera. As a result, it is possible to provide an easily configurable, particularly precise, in particular absolute position determination. In this context, a camera should be understood to mean an apparatus provided for a continuous capture of image data. The camera may be embodied as an optical camera, an infrared camera or as a camera for a different wavelength range. Preferably, the camera is arranged stationary relative to the examination surface, for example on a tripod, and provided to capture a position of the locating sensor on the examination surface. It is conceivable for the camera to have a single optical unit or a plurality of optical units and, for example, to be embodied as a stereo camera. In this embodiment, the locating apparatus preferably has at least one marker which is fixed in space relative to the locating sensor and provided to be captured by the position sensor, in particular by the camera. In this context, a marker should be understood to mean, in particular, a region which has a surface that differs from the surroundings of the region for the purposes of capture by the position sensor. Preferably, the marker is provided for capture by the camera. Preferably, to this end, the surface of the marker has a color, structure and/or reflection properties in accordance with the wavelength range, in which the camera is sensitive, which differs from the surroundings of the marker. Particularly preferably, the locating system has a plurality of markers, which are each provided to supply position data if some of the markers are covered, at least from time to time, for the position sensor, in particular the camera, during the locating process.

The locating system further has a control apparatus for actuating the functional components of the locating system, in particular for actuating at least the locating apparatus, the position sensor and an evaluation apparatus, preferably also an input and/or output apparatus, a data communication interface, a memory apparatus and further components appearing expedient to a person skilled in the art. In particular, a control apparatus should be understood to mean an apparatus with at least one control electronics element, which has means for communicating with the other components of the hand-held locating system, for example means for open-loop and/or closed-loop control of the locating apparatus and/or means for data processing and/or further means appearing expedient to a person skilled in the art. In particular, the control apparatus is provided to adjust at least one operating functional parameter of the locating system depending on at least one user input and/or an evaluation result from the evaluation apparatus. Advantageously, the control electronics of the control apparatus may be understood to mean a processor unit in conjunction with a memory unit and with an operating program stored in the memory unit, said operating program being run during the control process. In particular, the electronic components of the control apparatus may be arranged on a circuit board (printed circuit board), preferably in the form of a microcontroller. Particularly advantageously, the control apparatus may moreover be provided to control the entire locating system and facilitate the operation thereof. To this end, the control apparatus is provided to communicate with the other functional components of the locating system, in particular the locating apparatus, the evaluation apparatus, the position sensor, an input and/or output apparatus, a memory apparatus and a data communication interface and/or further components appearing expedient to a person skilled in the art.

An energy supply apparatus of the locating system is provided to supply the locating system with electrical energy, both for startup and during the operation. Preferably, this apparatus is a mains-independent energy store, in particular an accumulator, a battery, a fuel cell, a capacitor, another energy store appearing expedient to a person skilled in the art or a combination/plurality thereof. Preferably, accumulators with a cell chemistry providing a high power and/or energy density are particularly suitable for supplying the locating system with energy. Currently, these include e.g. accumulators with lithium and lithium ion cell chemistry, in particular lithium iron phosphate accumulators, lithium manganese oxide accumulators, lithium nickel cobalt manganese oxide accumulators, over-lithiated lithium nickel cobalt manganese oxide accumulators, lithium sulfur accumulators, lithium polymer accumulators and lithium oxygen accumulators. Preferably, the apparatus for energy supply has a detachable interlocking and/or force-fit connection interface. In this context, detachable should be understood to mean, in particular, separable in a non-destructive manner. Hence, the apparatus for energy supply is arrangeable on the locating appliance, preferably in a removable and interchangeable manner. Particularly preferably, the removable apparatus for energy supply may be resupplied and recharged with energy from mains power when within and/or outside of the locating appliance. In an alternative, or additional, embodiment, the locating system, for the energy supply thereof, may also have a power cable.

According to the disclosure, the locating system has at least one evaluation apparatus which is configured at least to determine and/or provide a direction-resolved and/or spatially resolved locating information item from the locating data without repositioning the locating apparatus in relation to the examination surface in a first mode of operation of the locating system and determine and/or provide an at least three-dimensional locating information item from the locating data and the position data by assigning locating data to position data in a second mode of operation.

A mode of operation of the locating system should denote, in particular, information processing, an information output and/or an information input and/or an information entry, in which the control apparatus and/or the evaluation apparatus and/or the display apparatus applies an operating program and/or a closed-loop control routine and/or an open-loop control routine and/or an evaluation routine and/or a calculation routine and/or a display routine. In particular, the application of a mode of operation of the locating system brings about an effect on the function and/or the interaction of the functional components of the locating system, for example on the control apparatus, the evaluation apparatus, the locating apparatus, the locating sensor, the position sensor, an input and/or output apparatus, in particular a display apparatus, a data communication interface and/or other components as well, which appear expedient to a person skilled in the art.

The evaluation apparatus should be understood to mean at least one apparatus having an information input, an information processing unit and an information output. The information input preferably serves to receive locating data determined by means of the locating apparatus and/or position data ascertained by means of the position sensor. The information processing unit serves to process, in particular evaluate, accepted data. The information output serves to forward the processed and/or evaluated data to the control apparatus and/or a memory apparatus and/or a data communication interface and/or an output apparatus and/or a display apparatus of the locating system. Advantageously, the evaluation apparatus has components which comprise at least one processor, a memory and an operating program with evaluation and calculation routines. In particular, the electronic components of the evaluation apparatus may be arranged on a circuit board, preferably on a common circuit board with the control apparatus, particularly preferably in the form of a microcontroller. Particularly preferably, the control apparatus and the evaluation apparatus may further also be embodied as a single component. Furthermore, the evaluation apparatus may also be embodied with components of the display apparatus as a single component.

The evaluation apparatus is provided to be operated in two modes of operation. Preferably, the evaluation apparatus is provided here at least to determine and/or provide a direction-resolved and/or spatially resolved locating information item from the locating data without repositioning the locating apparatus in relation to the examination surface in a first mode of operation of the locating system.

In particular, determining and/or providing a locating information item should be understood to mean that at least one information item relating to an existence, a position, a depth, a material and/or an alignment of an object to be located which is concealed under an examination surface is determined by the evaluation apparatus from locating data captured by the locating apparatus and/or made available to the locating system. In this manner, the evaluation apparatus, in a structurally particularly simple manner, permits evaluation of the electrical signals, in particular locating data, provided by the locating apparatus and determination of a locating information item therefrom and providing said locating information item to the locating system. In particular, the locating information items are made available to the locating system, preferably a display apparatus and/or a data communication system and/or a memory apparatus, for further processing by the evaluation apparatus.

A direction-resolved and/or spatially resolved locating information item should be understood to mean, in particular, an information item about at least one object to be located, at least in two directions along which the examination surface extends. A directional and/or spatial resolution is preferably effected in relation to the examination surface, in particular on the basis of given and/or definable references in respect of the locating apparatus as a reference. Such a correlation of the direction or the location of the locating process in relation to the locating apparatus may, for example, be realized using angles and/or coordinates. In this manner, it is possible, for example, to link a locating process of a concealed object to a directional specification, under which the corresponding locating data, and hence the evaluated locating information items, may be detected as seen from the locating apparatus. Furthermore, an estimate of the arrangement of the at least one object to be located which is concealed under the examination surface may be derived from the direction-resolved and/or spatially resolved locating information item.

According to the disclosure, the direction-resolved and/or spatially resolved locating information item is determinable without repositioning the locating apparatus in relation to the examination surface. In particular, "repositioning" should be understood to mean a displacement, movement, shift, rotation, turn or other change of the position and/or the alignment of the locating apparatus, carried out in any direction, in relation to the examination surface. As a result of the configuration according to the disclosure of both the locating apparatus and the evaluation apparatus, a particularly comprehensive locating information item may be derived in a structurally simple and space-saving manner. In particular, a particularly accurate derivation of a lateral position of a concealed object to be located is possible without the locating apparatus needing to be repositioned on the examination surface. Furthermore, what may be achieved is that evaluated locating information items may be correlated with a direction information item and/or location information item, in particular a position of the locating apparatus on the examination surface.

Particularly preferably, multi-dimensional matrices, tables, lists and/or map information items may be created and/or evaluated by determining and providing direction-resolved and/or spatially resolved locating information items. Locating data with direction information items and/or location information items, in particular in relation to the locating apparatus, preferably in relation to the examination surface, may be captured in these multidimensional matrices, tables, lists and/or map information items. Particularly advantageously, these matrices, tables, lists and/or map information items may be used as a basis for generating a depiction of the evaluated locating data in the form of an at least two-dimensional map or a two-dimensional image of the examination surface.

In this way, it is possible for a user of the locating system to nevertheless obtain a locating information item which is direction-resolved and/or spatially resolved in a certain detection zone of the locating apparatus by way of only one measurement and without a complicated repositioning of the locating apparatus in relation to the examination surface. A statement as to whether, for example, drilling may be carried out at the selected (measurement) position on the examination surface without damaging examination articles concealed under the examination surface is derivable directly and with high reliability from the direction-resolved and/or spatially resolved locating information item. Furthermore, objects to be located which are situated in the vicinity of the selected position may already be identified, and so a user may more easily estimate a risk or hazard. By way of example, this information may be particularly advantageously and intuitively effected to a user of the appliance by the output of an at least two-dimensional map information item. In a preferred embodiment, the at least two-dimensional map information item may be realized e.g. as two-dimensional map or as a two-dimensional image of the locating conditions under the examination surface. It may immediately be gathered from the map or the image where, i.e., in particular, in what directions as seen from the locating apparatus, objects to be located are detected. By way of example, in a preferred embodiment, a map output to a user may reproduce a true-to-scale 1:1 image of the locating conditions which are concealed under the locating apparatus. In this manner, a particularly simple transfer of positions of located objects to be located, which may be gathered from the map, to the workpiece is possible. Then, an object to be located displayed in the map is situated, as seen from the user, precisely at the corresponding position directly behind the locating apparatus, concealed under the examination surface.

Alternatively, or additionally, other depiction scales are also conceivable. In particular, illustrations which are true to scale and not true to scale may both be used as output for a user of the locating system.

It should be noted here that the phrase "map information item" within the scope of this application in particular denotes data which are preferably processed and/or stored and/or forwarded in the form of an, in particular multidimensional, matrix, table, array, list or the like. Preferably, the map information item comprises direction-resolved and/or spatially resolved locating information items, alternatively or additionally multi-dimensional, in particular pseudo-multi-dimensional, but at least two-dimensional evaluated locating information item, preferably locating information items, which are correlated with two-dimensional position data of the locating apparatus in relation to the examination surface at the locating time. The map information item is provided to be output at least partly in the form of a map to a user of the locating system by means of a display apparatus. Here, the "map" represents a graphically prepared representation of the map information item. Within this meaning, the terms "map information item" and "map" should be understood to be different from, but closely linked to, one another. In particular, expressions such as "the display apparatus is provided to depict the at least two-dimensional map information item" are equivalent to "the display apparatus is provided to depict the at least two-dimensional map information item in the form of a map".

The evaluation apparatus is further provided to determine and/or provide an at least three-dimensional locating information item from the locating data and the position data by assigning locating data to position data in a second mode of operation.

Advantageously, the evaluation apparatus is thus provided to assign the locating data generated by means of the locating apparatus, in particular, for example, amplitude values, depth information items, signal phases or the like ascertained by means of the locating sensor, to the position data, in particular two-dimensional position coordinates, ascertained by means of the position sensor. In principle, an assignment may also take place in reverse. In this way, the evaluation apparatus is provided to determine and provide an at least three-dimensional locating information item from the locating data and the position data. Hence, what may advantageously be achieved is that evaluated locating information items may be correlated with a position of the locating apparatus in relation to the examination surface.

Hence, the at least three-dimensional locating information item should therefore be understood to mean the correlated locating data and position data in at least two directions, along which the examination surface extends. In a simple embodiment, the at least three-dimensional locating information items form e.g. a multidimensional matrix, table, array or the like. In this multi-dimensional matrix, table, array or the like, it is possible, for example, to assign position data in respect of respectively one of two orthogonal spatial directions in respectively one column. A third column serves for the assignment of locating data ascertained at the corresponding position and/or already evaluated locating information items, such as e.g. an information item about the presence of an object to be located or an information item about the depth, in which an object to be located is detected. Hence, locating data or locating information items are captured together with position data as at least three-dimensional locating information item.

Advantageously, a successive measurement of the examination surface may be carried out by successive repositioning, in particular displacing of the locating apparatus in relation to the examination surface. Here, at least three-dimensional locating information items, in which locating data in respect of position data and/or alignments of the locating apparatus, in particular in relation to the examination surface, are captured, are successively determined and/or provided. Particularly advantageously, these may be used to generate an at least two-dimensional map information item and/or a depiction of the evaluated locating data in the form of a two-dimensional map of the examination surface.

In an advantageous embodiment of the locating system according to the disclosure, an input apparatus for inputting work parameters and/or an output apparatus for outputting work parameters is present. In the preferred embodiment of the locating appliance, the input apparatus and/or the output apparatus is advantageously arranged in a housing side facing the user of the locating appliance during the use thereof. A housing side refers, in particular, to an outer wall of the housing delimiting the locating system, in particular the locating appliance, in relation to the surroundings thereof. Here, "arranged in a housing side" should be understood to mean that the input apparatus and/or the output apparatus is/are inserted, applied or affixed in another way on the housing side in the surface thereof. In particular, the housing itself may also be part of the input or output apparatus.

Work parameters denote all necessary and/or expedient operational parameters of the locating system, in particular in relation to the control thereof, and parameters relating to the evaluation of the measurement results.

In particular, an input apparatus should be understood to mean a means provided to accept at least one information item from a user of the locating system and to forward this to the control apparatus and/or the evaluation apparatus. By way of example, the input apparatus may be realized in the form of a user interface and/or using another appliance. Here, a user input may, in particular, be carried out by way of an acoustic, optical, gesture-assisted and/or tactile input. By way of example, the input apparatus may consist of an actuating element, a keyboard, a display, in particular a touchscreen display, a speech input module, a gesture identification unit and/or a pointer appliance (e.g. a mouse). Furthermore, the input apparatus may additionally be present also outside of the locating system, in particular outside of the locating appliance, for example in the form of an external data appliance such as a smartphone, a tablet PC, a PC or any other external data appliance appearing expedient to a person skilled in the art which is connected to the control apparatus and/or the evaluation apparatus of the locating appliance by way of a data communication interface. The latter is advantageous, in particular, if the external data appliance permits and/or assists an extended functionality of the locating system, for example a specifically prepared input possibility or the like.

An output apparatus should be understood to mean at least one means provided to output at least one changing information item in an acoustic, optical and/or tactile manner to a user of the locating system, in particular the locating appliance. By way of example, this may be realized by means of a display, a touch display, a sound signal, a change in an operational parameter, a vibration transducer and/or an LED display. In a particularly preferred embodiment, the output apparatus may be realized as a display apparatus. Furthermore, information items to be output, e.g. evaluation results and/or information items relating to an operating state of the locating appliance, may also be output to a functional component of the locating system, in particular to the control apparatus, to the locating apparatus, to the position sensor, to the evaluation apparatus and/or, particularly for increasing the user comfort, to a data processing system. The latter comprises at least also an output of an information item to an external appliance such as a smartphone, a tablet PC, a PC or any other external data appliance appearing expedient to a person skilled in the art, which is connected to the evaluation apparatus and/or the control apparatus of the locating system by way of a data communication interface.

Both the input apparatus and the output apparatus may advantageously be housed directly in the housing of the locating system, in particular in the housing of a mobile locating appliance. Alternatively, or additionally, the input and/or output apparatus may also be outsourced and, for example, realized by way of external apparatuses. The latter realization option explicitly comprises the control, evaluation and output of measurement results by way of wired and/or wireless external systems such as e.g. remote controls, computer controls, tablet PCs and/or other mobile appliances such as cellular telephones, smartphones etc.

In one advantageous embodiment of the locating system, provision is made of at least one memory apparatus for storing measurement results and/or locating information items and/or work parameters. In particular, a memory apparatus should be understood to mean an electronic data memory comprising the means required for the actuation thereof. The memory apparatus is provided for storing and recalling measurement results and/or locating information and/or work parameters and/or other data required or expedient within the scope of operating the locating system. In particular, the memory apparatus is provided to store, at least temporarily, and recall locating data and/or evaluated locating information, preferably at least two-dimensional map information items as well. In principle, it is also conceivable for the memory apparatus to be provided for storing and recalling data components.

Preferably, the memory apparatus is embodied as a memory which is writable and readable by the evaluation apparatus and/or the control apparatus. The memory apparatus may comprise all forms of external and internal electronic memories, in particular digital memories, for example a RAM component or integrated circuits. Alternatively, or additionally, the memory apparatus may, in particular, also be provided for writing and reading changeable storage media such as memory chips, USB sticks, memory sticks, memory cards, SD cards or the like. In a preferred configuration, the memory apparatus may be integrated into the evaluation apparatus and/or into the control apparatus and/or into the input apparatus and/or into the output apparatus, i.e., for example, embodied as part of a memory of the evaluation apparatus.

Moreover, it is proposed that the locating system has a data communication interface for, in particular, wireless communication, by means of which the locating appliance may interchange data, in particular transmit and/or receive measurement results and/or locating information items and/or work parameters. In terms of signaling, the data communication interface is connected to at least the control apparatus and/or the evaluation apparatus of the locating system. Preferably, the data communication interface uses a standardized communication protocol for transmitting electronic, in particular digital data. Advantageously, the data communication interface comprises a wireless interface, in particular e.g. a WLAN, Bluetooth, infrared, NFC, RFID interface or any other wireless interface appearing expedient to a person skilled in the art. Alternatively, or additionally, the data communication interface may also have a wired adapter, e.g. a USB or micro USB adapter.

Advantageously, measurement results and/or locating information items and/or work parameters may, by way of the data communication interface, be transmitted from the locating system to an external data appliance, for example a smartphone, a tablet PC, a PC, a printer or further external appliances appearing expedient to a person skilled in the art, or received thereby. By means of the configuration according to the disclosure, it is advantageously possible to facilitate a transfer of data which is usable for further evaluation of measurement signals and/or locating information items captured by the locating system. Furthermore, multifaceted additional functions may advantageously be facilitated and included, which additional functions, in particular, also require direct communication with smartphones (in particular by way of programmed apps) or similar portable data appliances. By way of example, these may comprise automatic mapping functions, firmware updates, data postprocessing, data preparation, data reconciliation with other appliances, or the like.

In an advantageous embodiment of the locating system according to the disclosure, in particular of a hand-held locating appliance, the locating apparatus is provided to capture locating data in a direction-resolved and/or spatially resolved manner in relation to objects to be located which are concealed under an examination surface.

Preferably, the locating apparatus permits direction-resolved and/or spatially resolved capture of an information item about an object to be located, at least partly in two dimensions or directions, along which the examination surface extends. The direction and/or spatial resolution is preferably effected in relation to the examination surface, in particular on the basis of predetermined and/or fixable references in respect of the locating apparatus as a reference. A correlation of the direction or the location of the locating process with reference to the locating apparatus may, for example, be realized using angles and/or coordinates. Therefore, what may advantageously be achieved is that evaluated locating information items may be correlated with a direction and/or location information item, in particular in view of a position and/or alignment of the locating apparatus on the examination surface. By way of example, such a correlation may be realized using relative locating angles or relative locating coordinates, which in each case define relative angles or coordinates in relation to a feature of the locating apparatus, in particular e.g. the center point thereof.

In this way, it is possible, for example, to link a locating process of a concealed object with a directional specification, under which the corresponding locating data are detected as seen from the locating apparatus. A directional and/or spatial resolution therefore is effected merely using the locating apparatus itself, and so a repositioning of the locating apparatus in relation to the examination surface is not required for generating a directional and/or spatial resolution.

Furthermore, an estimate of the arrangement of an object to be located which is concealed under the examination surface may be derived from the direction-resolved and/or spatially resolved locating information item. To this end, the locating apparatus preferably outputs locating data, by means of which a direction-resolved and/or spatially resolved arrangement of objects to be located which are concealed under the examination surface is derivable.

Preferably, direction-resolved and/or spatially resolved locating data are captured and provided for further processing by the use of a direction-resolving and/or spatially resolving locating apparatus. In particular, the locating data may be evaluated by means of the evaluation apparatus such that direction-resolved or spatially resolved locating information items are obtained. These locating information items may then be processed further and, in particular, also be depicted or output in matrices, tables and/or as at least two-dimensional map information items. Particularly advantageously, the direction-resolved and/or spatially resolved locating information items may then be used to generate a depiction of the evaluated locating data in the form of an at least two-dimensional map information item or an image of the examination surface, in particular also as a multidimensional map information item. Advantageously, the use of a direction-resolving and/or spatially resolving locating apparatus permits the creation of a map information item with direction-resolved and/or spatially resolved locating information items in relation to the examination surface around the locating apparatus. The creation of a map information item with direction-resolved and/or spatially resolved locating information items relating to the examination surface around the locating apparatus is realized particularly advantageously without repositioning the locating apparatus in relation to the examination surface.

In an embodiment of the locating apparatus, the latter may for example be provided to capture locating data in different, mutually independent directions of extent, solid angles or spatial volumes.

In an advantageous embodiment of the locating system according to the disclosure, in particular of a hand-held locating appliance, the locating apparatus has at least one locating sensor which is direction-resolving and/or spatially resolving in a detection zone.

Hence, a direction-resolving and/or spatially resolving locating apparatus may be realized in a constructionally particularly simple manner. In particular, the direction-resolving and/or spatially resolving locating sensor may be provided to measure in different, mutually independent directions of extent, solid angles or spatial volumes and hence capture locating data in a detection zone in a direction-resolving and/or spatially resolving manner. Accordingly, the detection zone is composed of the mutually independent measurable directions of extent, solid angles or spatial volumes. In an advantageous configuration of the locating apparatus according to the disclosure, the locating apparatus may preferably have at least one direction-resolving and/or spatially resolving locating sensor from a group of sensors which at least comprises sensors based on dielectric and/or resistive methods, in particular capacitance sensors, microwave sensors, ultrasonic sensors, resistance sensors, conductivity sensors and/or radar sensors, in particular also ultra-broadband radar sensors and/or broadband pulse radar sensors, but also induction-sensitive sensors, radiation-sensitive sensors and magnetic-field-sensitive sensors. Furthermore, other locating sensors appearing expedient to a person skilled in the art may also be provided.

The direction-resolving and/or spatially resolving locating sensor is provided to capture physical and/or chemical variables, which allow the presence of an object to be located to be deduced, in a direction-dependent and/or spatially dependent manner and convert these variables into an electrically evaluable signal. By way of example, such physical and/or chemical variables represent an electric and/or magnetic field change, or else a time-of-flight change too. Preferably, the direction-resolving and/or spatially resolving locating sensor may be embodied e.g. as an inductive sensor, an AC sensor or a capacitive sensor. Alternatively, the direction-resolving and/or spatially resolving locating sensor may be provided for a locating process by means of electromagnetic radiation, for example in the form of a 50 Hz sensor, a microwave sensor, a radar sensor, a terahertz sensor, an ultrahigh frequency sensor, an x-ray sensor, an infrared sensor or an NMR sensor. Furthermore, a direction-resolving and/or spatially resolving sound sensor, e.g. an ultrasonic sensor or impact echo sensor, is also conceivable.

Preferably, the direction-resolving and/or spatially resolving locating sensor has means permitting the influence of the detection zone and/or of the mutually separately measurable directions of extent, solid angles or spatial volumes and hence the influence of the directional and/or spatial resolution of the locating sensor.

Particularly preferably, the direction-resolving and/or spatially resolving locating sensor may represent a radar sensor. In this exemplary embodiment, the detection zone represents a solid angle or a spatial volume, into which electromagnetic radiation is emitted and from which scattered electromagnetic radiation is received.

In an advantageous embodiment of the locating system according to the disclosure, in particular of a hand-held locating appliance, the at least one direction-resolving and/or spatially resolving locating sensor of the locating apparatus is embodied as an electrically and/or mechanically swiveable locating sensor and/or as an electrically alignable locating sensor and/or as an array of locating sensors and/or as an imaging locating sensor.

A mechanically swiveable locating sensor represents a particularly simple realization of a direction-resolving and/or spatially resolving locating sensor, in which virtually any sensor, for example a sensor based on dielectric and/or inductive and/or resistive methods, may be used. As a consequence of the mechanical swiveling of the locating sensor, it is possible to carry out an at least partly direction-resolving and/or spatially resolving locating process with any usable locating sensor. In a preferred embodiment, the mechanically swiveable locating sensor advantageously may also be swiveled in an automated manner using an electric circuit in conjunction with motors or comparable actuators. Hence, speed and precision of the swiveling movement may be increased.

In an alternative or additional embodiment, there may also be aligning (directing) of the locating sensor, in particular of a signal emitted and/or detected by the locating sensor, by way of an electrical actuation in the case of a suitable selection of the locating sensor. By way of example, this may advantageously be realized using locating sensors which emit and/or detect electromagnetic radiation. In these, an antenna, in particular a directional antenna, which is electrically actuatable in different ways and therefore electrically alignable may preferably be realized by a suitable configuration of the locating sensor in conjunction with a suitable configuration of an actuation of the locating sensor. Reference is made to the fact that the electrical alignment by electrical actuation differs from an electrical, in particular motor-driven, swiveling of the locating sensor.

In the aforementioned realization forms, direction-resolved and/or spatially resolved locating data are preferably ascertained depending on a swivel angle and/or a swivel position and/or an alignment angle and/or an alignment position by means of the locating sensor and output to the evaluation apparatus.

Alternatively, or additionally, a direction-resolving and/or spatially resolving functionality may advantageously also be realized by use of a plurality of locating sensors, in particular arrays of locating sensors. Here, the sensors may be used in e.g. a regular, in particular a periodic, preferably two-dimensional arrangement. Here, each individual sensor of the arrangement, in particular of the array, captures at least one solid angle and/or one spatial volume. In this way, a reliable, spatially resolving locating process may be realized within a detection zone of the locating sensor defined by the sum of the detection zones of each individual sensor. In particular, use may particularly preferably also be made of an imaging locating sensor, for example a locating sensor consisting of a multiplicity of pixels, in order to realize a direction-resolving and/or spatially resolving locating process. The plurality of locating sensors or the array of locating sensors or the imaging locating sensor in each case capture direction-resolved and/or spatially resolved locating data, which are subsequently output to the evaluation apparatus for further processing.

In a preferred embodiment, the direction-resolving and/or spatially resolving locating sensor is embodied as a direction-resolving and/or spatially resolving locating antenna, in particular as a radar antenna or an LCR antenna. In particular, a locating antenna should be understood to be a means which is provided to wirelessly emit and/or receive power in the form of an, in particular electromagnetic, wave, in particular in the microwave range. To this end, the locating antenna preferably has a transmission unit and/or a reception unit, wherein the transmission unit and/or the reception unit is/are provided to transmit electromagnetic signals with directional resolution and/or spatial resolution in defined directions of extent or to receive a reflection of the emitted signal with directional and/or spatial resolution from defined directions of extent. In particular, transmission and/or reception characteristics of the locating antenna are defined in this way, under which characteristics electromagnetic radiation is substantially transmitted and/or received in the direction of extent determining the transmission and/or reception characteristic. Preferably, the locating antenna is actuatable by means of a switching unit for adjusting the transmission and/or reception characteristic of the locating antenna, and hence the direction of extent. In particular, a switching unit should be understood to mean a unit provided to interconnect at least one interface, preferably at least two interfaces, of the locating antenna in a variety of ways in different operating states of the locating antenna. Preferably, the switching unit selectively connects the locating antenna with, in particular, a signal generator, a demodulator and/or a terminating resistor adapted to the locating antenna. As a result of the targeted actuating by means of the switching unit, it is possible to realize varying transmission and/or reception characteristics of the electromagnetic radiation transmitted and/or received by means of the locating antenna, accompanying varying directions of extent, in a simple manner.

Preferably, the transmission and/or reception unit demodulates any characteristic appearing expedient to a person skilled in the art, but advantageously, a time-of-flight, a frequency, an amplitude and/or, particularly advantageously, a phase angle of the reflected signal.

Preferably, a locating process with directional and/or spatial resolution in a detection zone may be realized in this manner by transmitting and receiving radiation in or from different directions of extent. Here, it is advantageously possible to dispense with movable components, for example a swiveling device or the like.

The sum of the directions of extent, in particular the sum of the spatial volumes defined by the different directions of extent, defines the detection zone of this electrically alignable locating apparatus.

In an advantageous embodiment of the locating system according to the disclosure, in particular of a hand-held locating appliance, the direction-resolving and/or spatially resolving locating sensor of the locating apparatus has a predeterminable, in particular selectable or adjustable, detection zone.

The detection zone of the locating sensor may be predeterminable, in particular selectable or adjustable, in terms of the spatial alignment thereof in relation to the locating sensor—and hence also in relation to the locating apparatus—or in terms of the size thereof. In particular, a size of the detection zone characterizes the volume defined by the detection zone and/or a diameter of the volume defined by the detection zone and/or a spanning angle α of the locating sensor with a directional resolution over a solid angle. Advantageously, this allows a detection zone to be realized, the size and/or the alignment of which is predeterminable, in particular selectable or adjustable. In particular, the predeterminable detection zone serves for a variable, in particular selectable and/or adjustable, adaptation of a resolution of the locating sensor in respect of alignment and/or size of the locating range covered in metrological terms by the locating sensor.

By way of example, in view of the exemplary embodiment of the locating antenna, provision may be made for the solid angle defined by the sum of the transmission and/or reception characteristics with the respective directions of extent as detection zone of the locating antenna to be predeterminable and, in particular, selectable and/or adjustable. By way of example, the locating antenna has a detection zone, the solid angle (α) of which is greater than 5 degrees, advantageously greater than 10 degrees, particularly advantageously greater than 15 degrees.

As a result of the configuration according to the disclosure of the locating apparatus, a locating process in a detection zone of the locating sensor may be realized in a constructionally simple manner, said detection zone being predeterminable, in particular selectable and/or adjustable. Hence, there may be focusing of the locating apparatus onto a freely predeterminable, in particular adjustable and/or selectable, detection zone. Preferably, the locating data ascertained thus by means of the locating apparatus are likewise related or restricted to the freely determinable, in particular adjustable and/or selectable, detection zone. A particularly accurate, i.e., in particular, a particularly direction-resolved and/or spatially resolved locating process, may therefore be achieved. Consequently, a particularly accurate determination of an angle-related and/or lateral position is advantageously possible using the locating sensor according to the disclosure.

In an advantageous embodiment of the locating system according to the disclosure, in particular of a hand-held locating appliance, the evaluation apparatus is provided, in the first mode of operation of the locating system, to determine and/or provide a direction-resolved and/or spatially resolved locating information item on the basis of locating data captured by the direction-resolving and/or spatially resolving locating sensor.

Advantageously, the evaluation apparatus of the locating system is provided to ascertain at least one direction-resolved and/or spatially resolved locating information item, in particular also a position and/or alignment information item about the object to be located, from the locating data provided by the locating sensor. Hence, an accurate locating process with a high information content is possible in a constructionally simple manner. Preferably, the evaluation apparatus permits the determination and/or provision of a direction-resolved and/or spatially resolved locating information item on the basis of locating data captured by the direction-resolving and/or spatially resolving locating sensor in the first mode of operation of the locating system. In particular, the evaluation apparatus comprises means required for the appropriate evaluation, for example, in particular, closed-loop control routines, open-loop control routines and/or calculation routines. By way of example, calculation and/or assignment routines are provided, which allow the evaluation apparatus to assign the direction-resolved and/or spatially resolved locating data to the various directions and/or locations of the performed locating process. In this manner, it is possible, for example, to ascertain a direction-resolved and/or spatially resolved locating information item from the direction-resolved and/or spatially resolved locating data by assigning the locating data to solid angles or locating coordinates.

In an advantageous embodiment of the locating system according to the disclosure, in particular of a hand-held locating appliance, the evaluation apparatus is provided, in the second mode of operation of the locating system, to determine and/or provide, in particular to determine and/or provide in real time, an at least two-dimensional map information item from the at least three-dimensional locating information items in the second mode of operation of the locating system.

Advantageously, an at least two-dimensional map information item may thus be determined and provided by the evaluation apparatus, in which map information item position data and also locating data ascertained by means of the locating apparatus and/or already evaluated locating information items are correlated. In particular, it is possible to generate a particularly comprehensive, direction-resolved and/or spatially resolved, at least two-dimensional map information item in a simple manner.

Within the scope of this application, an at least two-dimensional map information item should be understood to mean data, in particular, which are provided to be output, at least in part, in the form of a map to a user of the locating system by means of a display apparatus. In a preferred embodiment, the output may be effected in the form of a two-dimensional map by way of e.g. a planar, two-dimensional output display of the display apparatus. Preferably, the map information item represents a locating information item, which is evaluated multidimensionally, in particular pseudo-multidimensionally, but at least two-dimensionally. Here, the characterization "two-dimensional" denotes the fact that the map information item contains an information item about objects to be located which are concealed under an examination surface in at least two directions, preferably in two orthogonal directions. Here, the two directions of the examination surface are assignable, for example on the basis of given and/or definable reference points. Preferably, the two directions extend in a plane of the examination surface, in particular along the examination surface and/or in a plane arranged parallel to the examination surface, which plane intersects the locating sensor. Preferably, the at least two-dimensional map information item at least comprises locating information items, which are correlated with two-dimensional position data of the locating device in relation to the examination surface at the locating time of the locating process. The locating information item, may, in particular, relate to information items or measurement values from at least one locating sensor immediately related to a measurement, for example amplitudes, phase angles, relaxation times or the like. Alternatively, the locating information item of the at least two-dimensional map information item may also relate to interpreted and/or prepared information items, such as directional information items, qualitative signal strengths of a locating signal, depth information items or the like. Particularly preferably, the at least two-dimensional map information item has locating information items, for example a depth information item or an information item about the presence of an object to be located, which should be output to a user of the locating system using color or grayscale encoding.

In this context, a depth information item should, in particular, be understood to mean an information item which reproduces a distance of the objects to be located from the examination surface and/or an extent of the objects to be located perpendicular to the examination surface.

In a preferred embodiment, the at least two-dimensional map information item may be processed and/or stored and/or output in the form of an, in particular multidimensional, matrix, table, array, list or the like. Here, an output may preferably be to the control apparatus and/or the display apparatus and/or the data communication interface for further use. In particular, the display apparatus is provided to process the at least two-dimensional map information item provided in the form of an in particular multidimensional matrix, table, array, list or the like and depict it as map information item in particular, preferably as a map, by means of a display element, for example a display. In particular, it should be noted that the display apparatus is then provided for depicting the at least two-dimensional map information item in the form of a color or grayscale encoded map.

By displaying an at least two-dimensional map information item, a location information item may be output for a user of the locating system in a particularly simple, clear and intuitively comprehensible manner. In a preferred embodiment, the at least two-dimensional map information item represents, for example, a two-dimensional map or a two-dimensional image which reproduces the locating conditions under the examination surface. From the map or the image, it is possible immediately to gather in an intuitive and simple manner the positions of the already examined examination surface at which objects to be located are detected.

The at least two-dimensional map information item preferably has a high information item density, by means of which a user may be assisted particularly well when interpreting the map information item. Advantageously, it is therefore possible to provide a locating system with a high operating comfort, which requires little learning or teaching outlay.

In an advantageous configuration, the evaluation apparatus is provided to determine and/or provide the at least two-dimensional map information item in real time. In particular, in this context, real time should be understood to mean that a processing speed of the evaluation apparatus corresponds to a repositioning speed, in particular displacement speed, of the locating apparatus by the user, i.e. the user is able to assign the movement carried out by him with the locating apparatus directly to a change in the map information item. The evaluation apparatus is provided to accept locating data and position data currently transferred in each case and exclude data received between two processing cycles from being processed. Preferably, the locating system leads the user to believe that the display of the locating system reproduces the locating data at least substantially without delay. As a result, the user is able to identify objects to be located particularly quickly and reliably and it is possible to provide a particularly efficient locating system.

In an advantageous embodiment, a determination and provision of the at least two-dimensional map information item is only restricted by an appliance-internal processing rate, i.e., in particular, by signal transfer speeds and an evaluation speed. In particular, a processing rate of locating data and position data, which are accepted by the evaluation apparatus, is matched to a processing speed of the evaluation apparatus. Hence, data which cannot be processed immediately by the evaluation apparatus remain unconsidered.

As a result of such a high processing rate, the user of the locating system may be conveyed the impression that locating data for a region over which the locating sensor has passed are evaluated immediately and provided as a map information item. In particular, the assumption of a determination and provision of the at least two-dimensional map information item in real time may be made if the appliance-internal processing duration up to the depiction of the at least two-dimensional map information item on a display element, in particular a display, of the display apparatus takes less than 2 seconds, preferably less than 1 second, particularly preferably less than 0.1 seconds.

In an advantageous embodiment of the locating system, the at least two-dimensional map information items determined and/or provided by the evaluation apparatus may be stored, at least temporarily, on the memory apparatus.

In an advantageous embodiment of the locating system according to the disclosure, in particular of a hand-held locating appliance, the evaluation apparatus is provided, in the first mode of operation and in the second mode of operation, to combine determined/ascertained locating information items.

A combination of locating information items determined, in particular provided or ascertained, in the first mode of operation and in the second mode of operation may be carried out, preferably in the form of preprocessing, preconditioning, combining, complementing, expanding, specifying, refining, accumulating, superposing, weighting, postprocessing, fusing or the like. Here, it is advantageously possible for locating information items determined or ascertained in the first mode of operation and/or in the second mode of operation to be combined with/by locating information items determined or ascertained in the second mode of operation or in the first mode of operation. Hence, locating information items determined in one of the two modes of operation may advantageously be combined with locating information items determined in the corresponding other mode of operation and hence it is possible to obtain an advantageously high information density. According to the disclosure, the locating information items determined in the two modes of operation are combined by the evaluation apparatus.

In this way, direction-resolved and/or spatially resolved locating information items ascertained in the first mode of operation of the locating system, which are ascertained from direction-resolved and/or spatially resolved locating data without repositioning of the locating apparatus, may be combined with at least three-dimensional locating information items ascertained in the second mode of operation, in which position data of the locating apparatus are correlated with locating data assigned to the corresponding positions in relation to the examination surface. In other words, this therefore facilitates the combination of locating information items which are ascertained without repositioning of the locating apparatus with locating information items which are obtained as a consequence of a repositioning of the locating apparatus. In this manner, it is possible to realize a locating system which combines locating information items ascertained in two modes of operation to form an overall locating information item in a particularly advantageous manner. Furthermore, an intuitive application of the locating system is facilitated in this way.

In one application, the user of the locating system has available to them a locating system which facilitates initially obtaining a direction-resolved and/or spatially resolved locating information item in a certain detection zone of the locating apparatus by way of only one measurement without repositioning the locating apparatus in relation to the examination surface. A statement as to whether, for example, drilling may be carried out at a selected position on the examination surface without damaging examination articles concealed under the examination surface is derivable immediately and with a high reliability from the direction-resolved and/or spatially resolved locating information item. Furthermore, it is already possible to identify objects to be located which are situated in the vicinity of the selected position. Preferably, these substantially local locating information items, which are obtained without repositioning of the locating apparatus, are depicted in a map. In particular, objects to be located situated in the vicinity of the selected position at the edge of the map, which corresponds to the edge of the detection zone of the locating sensor, may be indicated. This makes it easier for the user to estimate a risk or hazard.

If, beside from that, the user is interested in an at least partial large-area overview of the objects to be located which are concealed under the examination surface, he guides the locating apparatus over the regions of the examination surface of interest, which are to be examined, using a free movement, for example a free wiping movement. The locating data ascertained in the process in the second mode of operation of the locating system may likewise advantageously be output in the form of an at least two-dimensional map information item to the user of the locating system.

According to the disclosure, the locating information items ascertained in the two modes of operation may now be combined by the evaluation apparatus. Hence, in a preferred embodiment, it is possible to realize a combined locating information item (overall locating information item) which takes account of the locating information items ascertained in both modes of operation and output said combined locating information item as e.g. two-dimensional map information item, in particular as a map or as a two-dimensional image of the locating conditions under the examination surface. The combined at least two-dimensional map information item or the image preferably has a high information density, by means of which a user may be assisted particularly well when interpreting the at least two-dimensional map information item. Furthermore, an operation of the locating system is possible in an intuitive manner and with a high operating comfort, and so little learning or teaching outlay is required for using the locating system.

In an advantageous embodiment of the locating system according to the disclosure, in particular of a hand-held locating apparatus, the evaluation apparatus is provided to complement and/or update and/or refine and/or overwrite already determined locating information items when repositioning the locating apparatus, in particular when passing over a region of the examination surface again.

Advantageously, it is therefore possible to complement and/or refine and/or update and/or overwrite a locating information item, in particular an at least two-dimensional map information item, preferably regions of an at least two-dimensional map information item, when locating objects to be located which are to be assigned to the region of the map information item. As a result of this, it is possible to achieve a high information density and/or quality and/or currentness of the locating information item, in particular the at least two-dimensional map information item. Furthermore, it is possible to provide a particularly intuitively interpretable locating system. Preferably, the complemented and/or refined and/or updated and/or overwritten locating information item is output immediately, i.e. in real time, to the user.

In this context, "complementing" and "refining" should be understood to mean, in particular, that the evaluation apparatus updates and/or complements already ascertained locating information items, for example locating information items read from the memory apparatus, using current locating information items. New locating information items for not yet assigned positions of the locating apparatus, in particular, are added to the existing locating information items. In particular, the complementing may lead to or be used for refining purposes, i.e. improving the resolution of the locating and/or position data and hence the locating information item. In this context, "refining" should be understood to mean, in particular, providing further locating information items and/or fusing further locating information items with already available locating information items and/or providing synthetic data and/or semi-synthetic data for the locating information item. Preferably, the evaluation apparatus increases an information density and/or directional and/or spatial resolution and resolves finer details during a renewed or further locating process. Preferably, the evaluation apparatus complements or refines the locating information items, in particular the map information items, in real time within the meaning of this application.

In this context, "updating" should be understood to mean, in particular, that the evaluation apparatus overwrites already ascertained locating information items, for example locating information items read from the memory apparatus, using current locating information items, in particular locating information items current in time. Hence, the evaluation apparatus sets a new, modified, in particular more current value for a position of the locating apparatus to the extent that the locating information items have changed in comparison with the locating information items read from the memory apparatus. In particular, updating may lead to, or be used for, an adaptation of the locating and/or position data and hence of the locating information item, which advantageously takes into account changes over time. Preferably, the evaluation apparatus updates the locating information items, in particular map information items, in real time.

In this context, "overwriting" should be understood to mean, in particular, that the evaluation apparatus overwrites, i.e. replaces, already ascertained locating information items, for example locating information items read from the memory apparatus, with newly ascertained locating information items. A new value for a position of the locating apparatus is set, independently of whether the locating information items have changed in comparison with already ascertained locating information items. In particular, overwriting may lead to, or be used for, a change in, or adaptation of, the locating and/or position data and hence in, or of, the locating information item. Preferably, the evaluation apparatus overwrites the locating information items, in particular map information items, in real time.

Hence, a user may improve, refine and/or update a locating result, i.e. a locating information item, in a region of particular relevance to him in a particularly simple manner. It is possible to achieve a particularly efficient locating process by virtue of a user of the locating system being able to examine relevant regions in relation to objects to be located in a targeted manner. In particular, it is therefore advantageously also possible to depict locating information items, in particular an at least two-dimensional map information item, more exactly, i.e. with more detail and a finer resolution, and/or in an updated manner by virtue of repeatedly or once again passing over a region of the examination surface to be examined with the locating apparatus. Furthermore, it is also possible in this way to capture redundant locating data.

It is possible to provide a particularly efficient and intuitively usable locating system, in particular locating appliance, since the locating system may capture comprehensive, preferably highly resolved locating information items within a short period of time. As a result, a particularly efficient locating process is realizable. Furthermore, it is possible to capture different features of the objects to be located and use these to classify the objects to be located. It is possible to provide a particularly multifaceted locating system, in particular locating appliance, with great operating comfort.

In an advantageous embodiment of the locating system according to the disclosure, in particular of a hand-held locating appliance, the evaluation apparatus further has a data improvement module. The data improvement module may be provided to equalize value variations by means of statistical methods and/or improve a contrast. To this end, this data improvement module may have a multiplicity of calculation routines which, in particular, comprise statistical functions, for example for calculating statistical moments. Preferably, the data improvement module may be used to carry out statistical evaluations such as e.g. weightings, mean value calculations of data or the like when complementing and/or refining and/or updating locating information items and hence ensure improved evaluation of locating data.

In an advantageous embodiment of the locating system according to the disclosure, in particular of a hand-held locating appliance, the evaluation apparatus is provided to complement and/or update and/or refine and/or overwrite locating information items already determined or ascertained in the first mode of operation when repositioning the locating apparatus, in particular when passing over a region of the examination surface again.

In this way, it is advantageously possible to realize a locating system, in particular locating appliance, in which locating information items ascertained in two modes of operation are combined to an overall locating information item. Locating information items already determined, i.e. ascertained, in the first mode of operation at an initial position are advantageously complemented and/or updated and/or refined and/or overwritten when once again passing over this initial position by means of the locating apparatus. In particular, locating information items, which, with a directional and/or spatial resolution, are ascertained substantially locally without repositioning of the locating apparatus of the locating system, may in this manner be complemented and/or updated and/or refined and/or overwritten with, or by, further locating information items as a consequence of a repositioning of the locating apparatus.

Hence, a locating system, in particular a locating appliance, is advantageously available to the user of the locating system, said locating system ascertaining and outputting locating information items in a particularly simple, clear and intuitively comprehensible manner. Particularly in conjunction with an output of the locating information item in the form of an at least two-dimensional map information item, preferably a map, it is advantageously possible to extend, refine and/or update the locating information items ascertained substantially locally, i.e. without repositioning of the locating apparatus, with locating information items ascertained within the scope of a large-area locating process as a consequence of the repositioning of the locating apparatus. The positions of the already examined examination surface at which objects to be located are detected may be immediately gathered from the always current, highly resolved map information item, in particular map, in an intuitive and simple manner.

In particular, this further allows capture of complementary or redundant locating information items and the combination of these with locating information items ascertained in the first mode of operation and/or second mode of operation. Consequently, it is possible to obtain a high locating quality and information density. The locating system may capture a large number of locating information items within a short period of time, as a result of which a particularly efficient locating process may be achieved. Furthermore, it is possible to capture different features of the object to be located and use said features to classify the objects to be located. It is possible to provide a particularly multifaceted locating system, in particular locating appliance, with a high operating comfort.

In an advantageous embodiment of the locating system according to the disclosure, in particular of a hand-held locating appliance, the evaluation apparatus is provided, in the first mode of operation and/or in the second mode of operation of the locating system, to interpolate and/or extrapolate the locating data and/or the locating information items.

In this manner, a locating information item, in particular a two-dimensional locating information item, which, in particular, is comprehensive may be provided particularly quickly. Incorrect measurements may be compensated and it is possible to achieve a high quality of the locating information item.

In particular, "interpolating" should be understood to mean that the evaluation apparatus calculates intermediate values proceeding from the available locating data and/or locating information items, in particular those stored in the memory apparatus, by means of an expedient calculation and/or weighting prescription. These intermediate values are assignable to points lying spatially between the available locating data or locating information items (or else to fields of a map information item broken down into components or pixels). In this context, "extrapolating" should be understood to mean, in particular, that, proceeding from available locating data and/or locating information items, in particular those stored in the memory apparatus, within a spatial region, the evaluation apparatus calculates values that are assignable to points lying spatially outside of this region by means of an expedient calculation and/or weighting prescription.

Furthermore, in an advantageous embodiment of the locating system, the evaluation apparatus may be provided to weight at least some of the locating data and/or locating information items during a generation and/or when complementing, refining, updating or overwriting the available locating information items in the first mode of operation and/or second mode of operation of the locating system. As a result, a redundancy of locating data and/or locating information items, in particular of already ascertained and new locating data and/or locating information items, may advantageously be used to obtain a high quality of the locating information items, in particular of an at least two-dimensional map information item. In this context, weighting should be understood to mean, in particular, that data are multiplied by a weighting factor during the generation and/or when complementing, refining, updating or overwriting. Preferably, the evaluation apparatus determines the weighting in a manner dependent on a data quality which is preferably ascertained by evaluating redundant data. In particular, the weighting factor may also be zero. In this case, data remain unconsidered within the scope of complementing, refining, updating or overwriting, for example data which are classified as a measurement error. Hence, the evaluation apparatus is also able to exclude locating data and/or locating information items during a generation, when complementing, when refining, when updating or when overwriting. Preferably, this hence also allows a locating information item to be excluded from an output to a user of the locating system, in particular, for example, a depiction by means of the display apparatus.

In an advantageous embodiment of the locating system according to the disclosure, in particular of a hand-held locating appliance, the modes of operation of the locating system are manually selectable.

In this manner, a user of the locating system may themselves select an operating mode of the locating system to be used and may therefore advantageously adapt an application and/or a measurement problem and/or measurement situation. Advantageously, it is possible to realize a locating system which may be used particularly flexibly and which may be operated in a targeted manner.

By way of example, if a user wishes a direction-resolved and/or spatially resolved but nevertheless substantially local locating information item about a defined initial point, for example to check whether drilling may be carried out at this initial point, they may set the first mode of operation of the locating system themselves. To this end, the user selects the first mode of operation, for example in a menu or by means of an operating element of an input apparatus of the locating system, in particular of the locating appliance. However, if the user wishes a locating information item relating to an examination surface with a relatively large area, they manually select the second mode of operation, for example likewise in a menu or by means of an operating element of an input apparatus of the locating system, in particular of the locating appliance. Subsequently, the user may carry out the, in particular, large area examination by way of repositioning the locating apparatus in relation to the examination surface.

In an advantageous embodiment of the locating system according to the disclosure, in particular of a hand-held locating appliance, a control apparatus is provided to select a mode of operation automatically and/or automatically switch between modes of operation of the locating system.

In this manner, a selection of an operating mode of the locating system to be used may advantageously be carried out automatically by the locating system, in particular by the control apparatus of the locating system. Hence, an ideal adaptation of the mode of operation to an application and/or a measurement problem and/or measurement situation may preferably be carried out. Particularly preferably, this may therefore preclude an incorrect operation by an inexperienced user.

Furthermore, operation of the locating system is accelerated and intuitive operation of the locating system is promoted.

Preferably, a user of the locating system may specify to the locating system whether there should be an automatic or manual selection or an automatic or manual switch between modes of operation. By way of example, this prescription is carried out using the input apparatus.

In an advantageous embodiment of the locating system according to the disclosure, in particular of a hand-held locating appliance, the control apparatus is provided to switch into the second mode of operation when a change in position and/or a change in alignment of the locating apparatus in relation to the examination surface is identified.

Preferably, a change in position and/or change in alignment of the locating apparatus is identified or detected by means of the position sensor. What may advantageously be realized in this manner is that a switch from the first mode of operation to the second mode of operation is carried out without input by a user but merely as a consequence of repositioning the locating apparatus. Alternatively, or additionally, a change in position and/or a change in alignment of the locating apparatus may also be identified or detected by means of an acceleration sensor which, for example, is sensitive to a repositioning acceleration and/or a rotational acceleration of the locating apparatus. Furthermore, it is also conceivable to identify or detect a change in position and/or change in alignment of the locating apparatus by using the locating apparatus, for example as a consequence of an analysis, in particular a comparison, of locating data detected in succession.

Advantageously, a particularly user-friendly and intuitive operation of the locating system is therefore facilitated for a user of the locating system. In particular, a user may initially carry out a direction-resolved and/or spatially resolved locating process around a selected initial point using the first mode of operation. This locating process takes place substantially locally, i.e. without repositioning the locating apparatus. Subsequently, a switch of the locating system into the second mode of operation is initiated by displacing or moving the locating apparatus in any direction, in particular by repositioning the locating apparatus. Using the second mode of operation, it is subsequently possible for the user to generate an at least two-dimensional map information item by successively passing over the examination surface with the locating apparatus. In the process, the direction-resolved and/or spatially resolved locating information item already ascertained in the first mode of operation is advantageously complemented, refined, updated or overwritten.

In a preferred embodiment of the locating system, in particular of the locating appliance, the control apparatus is provided to smoothly switch from the first mode of operation to the second mode of operation when a change in position and/or a change in alignment of the locating apparatus in relation to the examination surface is identified. "Smoothly switch from the first mode of operation to the second mode of operation" should be understood to mean, in particular, that a switch of the modes of operation of the locating system is advantageously not noticed by a user of the locating system. In an advantageous embodiment, the locating system initially locates in a direction-resolved and/or spatially resolved manner in the first mode of operation and outputs the locating information items as a two-dimensional map information item, in particular a map, to a user of the locating system. As a consequence of identifying a change in position of the locating apparatus, the control apparatus initiates a switch of the locating system into the second mode of operation. Even though the evaluation apparatus is subsequently operated in the second mode of operation, the user of the locating system cannot identify this switch. The locating information items, in particular the two-dimensional map information item, continue to be displayed unchanged, with only regions of the examination surface examined within the scope of repositioning the locating apparatus now being complemented and/or refined and/or updated and/or overwritten in the map information item.

In an advantageous embodiment of the locating system according to the disclosure, in particular of a hand-held locating appliance, a sensitivity of the identification of a change in position is predeterminable, in particular selectable and/or adjustable.

In particular, the sensitivity of identifying a change in position in the form of a sensitivity threshold of the means detecting the change in position may be predeterminable, in particular selectable and/or adjustable. By way of example, a sensitivity threshold of the position sensor and/or of the acceleration sensor, and hence the sensitivity of identifying a change in position, may be predeterminable, in particular selectable and/or adjustable, in one embodiment.

What may be realized by using a predeterminable, in particular selectable and/or adjustable, sensitivity of identifying a change in position is that the locating system only identifies or detects a repositioning of the locating apparatus in relation to the examination surface when the extent of the change in position at least corresponds to the sensitivity of identifying a change in position. Preferably, the sensitivity may be selected and/or adjusted by the user of the locating system, for example by selecting, predetermining or adjusting a sensitivity threshold of the means detecting the change in position. Hence, it is possible to predetermine the sensitivity from which a change in position is identified or detected as a repositioning of the locating apparatus, in particular as displacing, moving or scanning of the locating apparatus. Consequently, changes in position whose extent does not exceed the sensitivity threshold are not identified. The maximum sensitivity of identifying a change in position, in particular a minimum sensitivity threshold, is technically restricted by the smallest change in position of the locating apparatus which is just still resolvable by the means detecting the change in position, for example the position sensor. Advantageously, this may therefore preclude the control apparatus of the locating system carrying out a switch from the first mode of operation to the second mode of operation on account of small, in particular inadvertent, changes in position. By way of example, such inadvertent changes in position of the locating apparatus may unavoidably occur as a consequence of a trembling hand or shaking by the user.

In particular, the sensitivity may also be predetermined by determined parameters. By way of example, a sensitivity of identifying a change in position of the locating apparatus is provided in a preferred embodiment by the size or the diameter of the detection zone of the locating sensor. Hence, a switch from the first to the second mode of operation may advantageously occur when the carried-out repositioning of the locating apparatus corresponds to a distance on the examination surface which is at least greater than the size or the diameter of the detection zone of the locating apparatus locating in a direction-resolved and/or spatially resolved manner in the first mode of operation.

Alternatively, a sensitivity may also be predeterminable in a dynamic manner, for example depending on a repositioning speed or a repositioning acceleration of the locating apparatus. To this end, provision may be made of, in particular, functions, in particular evaluation functions, and/or tables which assign a corresponding, assigned sensitivity to a dynamic variable.

In an advantageous embodiment of the locating system according to the disclosure, in particular of a hand-held locating appliance, the locating apparatus has a placement identification apparatus provided to detect a placement and/or removal of the locating apparatus onto and/or from an examination surface.

The placement identification apparatus may be realized in very different ways, preferably as an optical, mechanical and/or electrical sensor, in particular e.g. as a scanner or switch which generates an output signal as a consequence of placing and/or removing the locating apparatus onto, and/or from, the examination surface. Furthermore, the placement identification apparatus may also be embodied as a distance sensor and detect and evaluate a distance between the examination surface and locating apparatus. In a preferred embodiment of the locating system, the placement identification apparatus may also be embodied as one component to the position sensor or, particularly preferably, be embodied to be identical to the position sensor. Alternatively, or additionally, the placement identification apparatus may also be realized using the locating apparatus.

Advantageously, a function of the locating system may be controlled, in particular started and/or stopped as a consequence of identifying a placement and/or removal of the locating apparatus onto, and/or from, the examination surface. By way of example, such functions may relate to selecting a mode of operation, switching the locating system on and/or off or illuminating the output apparatus, the start or the end of a locating process, a measurement, a recording of a measurement or the like. Preferably, previously ascertained locating information items may be deleted and/or a new data record may be started in the memory apparatus in particular as a consequence of identifying the placement of the locating apparatus, in which new data record locating information items to be ascertained, in particular an at least two-dimensional map information item, may be stored. In this way, a reset or restart function for a measurement of the locating system may be realized in a simple manner.

Alternatively, or additionally, storage and/or data transfer of the ascertained locating information items, in particular of an at least two-dimensional map information item, may be carried out as a consequence of identifying a removal of the locating apparatus from the examination surface. Moreover, a "hold" or "freeze" function for interrupting a locating process and/or for freezing a map information item output to a user of the locating system is also conceivable. By way of example, the "hold" or "freeze" function may be activated when there is a relatively long stay at the same position on the examination surface or when the locating apparatus is removed from the examination surface. This is advantageous, in particular, if the locating apparatus is used on examination surfaces which are difficult to see.

The locating system is therefore advantageously provided to assist the user in applying the locating system by automating functions of the locating system. Advantageously, an operating comfort and hence a user-friendliness of the locating system is significantly increased in this manner. Additionally, an incorrect application of the locating system by a user, in particular e.g. data loss or the like, may advantageously be avoided.

It should be noted that provision may alternatively or additionally be made for such functions to be designed to be manually activatable or deactivatable by the user such that these may be activated or deactivated as a consequence of an input or selection of the user using the input apparatus, in particular operating elements, of the locating system.

In an advantageous embodiment of the locating system according to the disclosure, in particular of a hand-held locating appliance, the control apparatus is provided to select and/or activate the first mode of operation when a placement of the locating apparatus onto an examination surface is identified by means of the placement identification apparatus.

An operating comfort when using the locating system may be significantly improved using the placement identification apparatus. Preferably, placing the locating apparatus onto an examination surface is detected by means of the placement identification apparatus and the first mode of operation of the locating system is selected by the control apparatus as a consequence thereof. What may be advantageously realized in this way is that the selection of the first mode of operation is effected without further action by a user, merely as a consequence of placing the locating apparatus onto an examination surface.

Advantageously, a particularly user-friendly and intuitive operation of the locating system is therefore facilitated for a user of the locating system. In particular, a user may immediately start with the locating process around a selected initial point after placement of the locating apparatus. Here, a direction-resolved and/or spatially resolved locating process is carried out using the first mode of operation. Here, the initial point preferably corresponds precisely to the point of the examination surface at which the user placed the locating apparatus.

Once the user has thereupon obtained an overview of the objects to be located which are detectable at this position, they may subsequently initiate a switch of the locating system into the second mode of operation by simply moving the locating apparatus in any direction, in particular by repositioning or displacing the locating apparatus. Using the second mode of operation, it is now possible for the user to generate an at least two-dimensional map information item by successively passing over the examination surface with the locating apparatus. Here, the direction-resolved and/or spatially resolved locating information item already ascertained in the first mode of operation is preferably complemented, refined, updated or overwritten.

In one embodiment of the locating system according to the disclosure, in particular of a hand-held locating appliance, the control apparatus is provided to start, in particular restart, a locating process, in particular a measurement, when a placement of the locating apparatus on an examination surface is identified by means of the placement identification apparatus.

In this way, it is possible to realize an intuitively usable reset or restart function for restarting a locating process of the locating system. Preferably, storing of already ascertained locating data, locating information items and/or map information items is coupled to the start of a locating process. Furthermore, a deletion of a map information item output to a user by means of an output apparatus may also be coupled to the start of a locating process.

In an alternative or additional embodiment, a new locating process may also be initiated by the locating system independently of an identification of the placement of the locating apparatus. By way of example, this may be carried out to avoid disturbing effects which adversely affect the integrity of the locating data, locating information items and/or the map information items. In particular, it is possible, for example, to initiate a new locating process if disturbing signals influencing the locating process are present or as a consequence of a detected temporal shift of the position data, and an inadequate accuracy of the position data accompanying this.

In an advantageous embodiment of the locating system according to the disclosure, in particular of a hand-held locating appliance, at least one display apparatus is present, which is provided to depict a locating information item, in particular depict an at least two-dimensional map information item.

The display apparatus is provided to depict a locating information item. Preferably, the display apparatus is provided to display at least a portion of a two-dimensional map information item, preferably depict at least one two-dimensional map information item or map. Thus, in this context, the display apparatus should be understood to mean, in particular, an apparatus which is connected with the evaluation apparatus for transferring and/or outputting display data. Preferably, the display apparatus has a planar, two-dimensional display element which is provided for a pictorial display or output of information items. In particular, the display apparatus is also configured to depict, and hence output, an at least two-dimensional map information item using the planar display element. Preferably, the display apparatus is provided for depicting grayscales, particularly preferably for depicting colors. It is also conceivable for the display to have a 3D-capable embodiment and comprise means provided to impart a three-dimensional image impression to a user. Preferably, it is therefore possible to output a map information item to a user of the locating system using a color or grayscale encoding. By depicting and outputting the locating information item to a user of the locating system by means of the display apparatus, it is possible to provide a particularly compact, flexible and directly usable locating system.

The display apparatus is preferably connected to the evaluation apparatus for transferring locating information items, in particular map information items. Here, the display apparatus may be connected to the evaluation apparatus by means of data cables or in a wireless manner. It is conceivable for the evaluation apparatus to be integrated in the display apparatus or for the display apparatus also to be configured as a single part with components of the evaluation apparatus.

The planar display element of the display apparatus may advantageously be realized as e.g. a liquid crystal display, an OLED display, an LED display, a monitor provided for other suitable display technologies, or as a projector. Alternatively, or additionally, the display apparatus may be provided to depict a locating information item by means of a 3D-capable display element.

In a preferred embodiment, the display apparatus is provided to process at least two-dimensional map information items in the form of, in particular, multidimensional matrices, tables, arrays, lists or the like and adapt these for depiction in the form of a map or at least a portion of a map. In particular, the display apparatus is provided to convert locating information items into a depiction attribute for a picture-type reproduction, for example into a grayscale value level, a grayscale value of a grayscale curve, a color value level, a color value of a color curve, a brightness level, a brightness value of a brightness curve, a saturation level or a saturation value of a saturation curve and/or a pattern and/or a symbol.

In one configuration, a storage apparatus may be integrated in the display apparatus. Furthermore, it is conceivable for the display apparatus to be embodied as part of the locating apparatus. It is likewise conceivable for the display apparatus to be embodied separately from the locating apparatus and/or for the locating system to comprise a further display apparatus which is embodied separately from the locating apparatus. The display apparatuses may be assigned to different locating sensors and/or different modes of operation of the locating system. It is furthermore conceivable for the locating system to have at least one interface to a display apparatus which is embodied as part of an external computer unit. Here, in particular, electronic data processing appliances are conceivable, for example computers, cellular telephones, smartphones, organizers, PDAs, tablets, laptops or the like.

In principle, it is also conceivable for the display apparatus only to be embodied separately from the locating appliance and to be connected by way of a wireless connection for the purposes of transferring output values, for example by way of a point-to-point connection, an ad hoc connection, a WLAN connection, a Bluetooth connection or the like.

Furthermore, the display apparatus is provided to convey the impression to a user of the locating system that, as a result of a high processing rate and depiction rate, locating data for a region over which the locating sensor has passed are evaluated immediately, preferably in real time, and depicted as a locating and/or map information item. A depiction in real time means, in particular, that the appliance-internal processing duration by the display apparatus up to the completed depiction of the locating information item on the display element takes less than 2 seconds, preferably less than 1 second, particularly preferably less than 0.1 seconds.

Preferably, the display apparatus is provided to output a locating information item, in particular an at least two-dimensional map information item, in a pictorial depiction at least substantially true to scale by means of the display element. In this context, a pictorial display should be understood to mean, in particular, an optical reproduction of the locating data, which is preferably true to scale and resolved in terms of position, said reproduction being provided to render at least outlines of the objects to be located identifiable by the user. Preferably, the pictorial display is provided for interpretation by a human observer and independent of a threshold-based detection process. Preferably, the map information item comprises current and stored locating data which were prepared for the image-type display. In principle, it is conceivable for the map information item to contain synthetic data, such as e.g. a lattice, symbols, lines, color distortions and/or shadows. The display apparatus is further provided to display an entire two-dimensional map information item, in particular in the form of a map, in one operating state.

In an exemplary embodiment, a depicted portion of a locating information item, in particular of an at least two-dimensional map information item, may have an imaging scale which corresponds to a ratio of the extents of the map information item in the display element to the extents of an assigned region of the examination surface. Advantageously, the imaging scale has the same imaging scale for a first dimension and for a second dimension. Particularly preferably, the imaging scale is changeable by a user of the locating system such that a map information item depicted in the display element may be magnified or reduced and hence it is possible to carry out zooming.

Alternatively, or additionally, other depiction scales are also conceivable. In particular, it is possible to use both depictions which are true to scale and depictions which are not true to scale for the purposes of output to a user of the locating system.

In principle, it is conceivable for the display apparatus to be provided for displaying a locating direction, a locating accuracy, symbols simplifying an interpretation of the locating information item, for displaying operating notices or the like. In particular, at least one further display element which is embodied separately from the display element for the locating information item may be provided for displaying these information items.

In particular, the display apparatus may be provided in a preferred embodiment of the locating system for depicting a locating direction of an object to be located relative to the locating sensor. This locating direction may preferably be depicted in the form of an arrow or by specifying an angle and a distance, or in a similar way. As a result, a directional notification, in particular the locating direction, in which the at least one object to be located is situated in relation to the locating sensor, may be displayed and output to the user. Hence, a region of the examination surface in which the object to be located is arranged may be examined further in a targeted manner. The separate output of a locating direction facilitates a particularly efficient locating process.

It should be noted that the display apparatus, in particular the display element, is, in addition to outputting locating information items, likewise provided to display all relevant, necessary and/or expedient work parameters for operating and controlling the locating system.

In an advantageous embodiment of the locating system according to the disclosure, in particular of a hand-held locating appliance, the display apparatus is provided to depict direction-resolved and/or spatially resolved locating information items determined/ascertained by means of, or using, the first mode of operation as an at least two-dimensional map information item.

According to the disclosure, the direction-resolved and/or spatially resolved locating information items ascertained using the direction-resolving and/or spatially resolving locating apparatus may be depicted in the form of an at least two-dimensional map information item, in particular as a map, in the first mode of operation. Advantageously, the depicted at least two-dimensional map information item reproduces the examination surface in the detection zone of the direction-resolving and/or spatially resolving locating apparatus. Preferably, the depiction is a pictorial depiction, at least substantially true to scale, of the direction-resolved and/or spatially resolved locating information item in the detection zone of the direction-resolving and/or spatially resolving locating apparatus. Preferably, locating information items are therefore reproduced optically, preferably in a manner true to scale and resolved in terms of direction and/or position.

In a preferred embodiment, the at least two-dimensional map information item is realized, for example, as a two-dimensional map or as a two-dimensional image of the locating conditions under the examination surface. It may immediately be gathered from the map or the image where, i.e., in particular, in what directions as seen from the locating apparatus, objects to be located are detected. By way of example, in a preferred embodiment, a map output to a user may reproduce a true-to-scale 1:1 image of the locating conditions which are concealed under the locating apparatus. In this manner, a particularly simple transfer of positions of located objects to be located, which may be gathered from the map, to the workpiece is possible. Then, an object to be located displayed in the map is situated, as seen from the user, precisely at the corresponding position directly behind the locating apparatus, concealed under the examination surface. Alternatively, or additionally, other depiction scales are also conceivable. In particular, illustrations which are true to scale and not true to scale may both be used as output for a user of the locating system.

In an exemplary embodiment, the depiction of the direction-resolved and/or spatially resolved locating information item as an at least two-dimensional map information item is preferably effected using grayscale value or color curves.

Preferably, the depicted at least two-dimensional map information item may comprise both currently measured locating data and also stored locating data, which were prepared for the pictorial display. In principle, it is conceivable for the map information item to contain synthetic data, such as e.g. a lattice, symbols, lines, color distortions and/or shadows.

Advantageously, it is therefore possible for a user of the locating system to obtain an at least two-dimensional map information item, in particular in the form of a map, with direction-resolved and/or spatially resolved locating information items in relation to the examination surface around the locating apparatus, said at least two-dimensional map information item being interpretable in an intuitive manner. Particularly advantageously, the creation of the at least two-dimensional map information item with direction-resolved and/or spatially resolved locating information items in relation to the examination surface around the locating apparatus is realized without repositioning the locating apparatus in relation to the examination surface. Therefore, the user of the locating system obtains in a clear, intuitive and easily interpretable manner an at least two-dimensional map information item by way of only one measurement and without repositioning the locating apparatus in relation to the examination surface. A statement as to whether, for example, drilling may be carried out at the selected position on the examination surface without damaging examination articles concealed under the examination surface is derivable immediately and with a high reliability from depiction of the at least two-dimensional map information item. Furthermore, objects to be located situated in the vicinity of the selected position may already be gathered in a simple manner from the depiction of the at least two-dimensional map information item, and so estimating of a risk or hazard is made easier for a user.

In an advantageous embodiment of the locating system according to the disclosure, in particular of a hand-held locating appliance, the display apparatus is provided to depict locating information items, in particular three-dimensional locating information items, determined by means of, or using, the second mode of operation as an at least two-dimensional map information item.

According to the disclosure, the locating information items ascertained in the second mode of operation, in particular at least three-dimensional locating information items, may be depicted in the form of an at least two-dimensional map information item, in particular as an at least two-dimensional map. Preferably, the depicted at least two-dimensional map information item reproduces the examination surface in respect of the region of the examination surface examined by repositioning the locating apparatus. Advantageously, the depicted at least two-dimensional map information item comprises at least three-dimensional locating information items, in which locating data with two-dimensional position data of the locating apparatus are correlated in relation to the examination surface at the locating time. The at least three-dimensional locating information item may, in particular, relate to information items or measurement values from at least one locating sensor immediately related to a measurement, for example amplitudes, phase angles, relaxation times or the like. Alternatively, the locating information item of the map information item may also relate to interpreted and/or prepared information items, such as directional information items, qualitative signal strengths of a locating signal, depth information items or the like. Preferably, the depiction is an at least substantially true-to-scale pictorial depiction of the locating information items. Preferably, locating information items are therefore reproduced optically, preferably in a manner true to scale and resolved in terms of direction and/or position. In an exemplary embodiment, a depicted portion of the locating information item, in particular of the at least two-dimensional map information item, may have an imaging scale which corresponds to a ratio of the extents of the map information item in the display element to the extents of an assigned region of the examination surface. The imaging scale may have the same imaging scale for a first direction and for a second direction. In an exemplary embodiment, the at least three-dimensional locating information item is depicted in the form of the at least two-dimensional map information item preferably using grayscale value or color curves. Preferably, it is possible immediately to gather from the at least two dimensional map information item or the two-dimensional image of the locating conditions under the examination surface where, i.e., in particular, in which directions, in particular as seen from the locating apparatus, and/or at which positions on the examination surface objects to be located are detected. Preferably, to this end, the at least two-dimensional map information item may comprise both current locating data and also stored locating data, which were prepared for the pictorial display. In principle, it is conceivable for the map information item to contain synthetic data, such as e.g. a lattice, symbols, lines, color distortions and/or shadows.

Using the second mode of operation, the user is able to generate an at least two-dimensional map information item by successively passing over the examination surface with the locating apparatus. Advantageously, a user of the locating system is able to obtain an intuitively interpretable, two-dimensional map with locating information items relating to the examination surface. By successively measuring an examination surface as a consequence of repositioning the locating apparatus in relation to the examination surface, the user of the locating system obtains a clear, intuitive and easily interpretable, at least two-dimensional map information item.

In an advantageous embodiment of the locating system according to the disclosure, in particular of a hand-held locating appliance, the display apparatus is provided to vary the displayed portion of the map information item depending on position data and/or depending on the mode of operation.

Preferably, the display apparatus and/or the evaluation apparatus is provided to determine a portion of the map information item to be displayed depending on the position data and/or depending on the mode of operation. As a result, it is possible to provide a particularly flexibly usable locating system and objects to be located may be located particularly quickly. Preferably, the display apparatus displaces or magnifies the displayed portion if the position data currently assigned to the locating sensor reach an edge region of the displayed portion. Preferably, the edge region has a width of 5 percent, preferably 10 percent and particularly preferably 15 percent of an overall extent of the displayed portion.

In an advantageous embodiment of the locating system, the display apparatus is provided to fix, in particular center, the displayed portion of the map information item in relation to a position of the locating sensor. Hence, the map information item is displaced and/or rotated when repositioning the locating apparatus on the examination surface in such a way that the current position of the locating sensor and hence of the locating apparatus—in relation to the displayed portion of the map information item—is always fixed, in particular centered. In this context, "fix" or "center" should be understood to mean, in particular, dynamic fixing or centering, i.e. the displayed portion of the map information item tracks the position of the locating sensor during a locating process. In other words, the position of the locating apparatus in the map information item, in particular map, displayed for the user is always fixed at a predefined point, in particular centered in the middle. When repositioning the locating apparatus on the examination surface, the displayed map information item, in particular map, is displaced so as to maintain this fixation, in particular centration.

In this manner, it is possible to provide a particularly intuitively usable locating system, which advantageously assists an orientation of the user which is intuitive and is not susceptible to errors either. Therefore, the user of the locating system is advantageously always provided with an output of a portion of the map information item which is intuitively assignable to the actual position of the locating apparatus in relation to the examination surface.

Preferably, the fixed, in particular centered position of the locating apparatus is marked in the map information item, in particular map, displayed for the user. By way of example, such a marking may be realized by a symbol in the form of crosshairs, a rectangle, a square or the like. Particularly preferably, the corresponding position is reproduced by a true-to-scale representation and/or silhouette of the locating appliance and/or of the locating apparatus and/or of the locating sensor and/or of the active sensor region of the locating sensor. Furthermore, it is conceivable for the parameters of the display relating to the fixed and/or centered illustration to be designed to be adjustable and/or selectable by a user. In particular, this allows e.g. a pair of coordinates to be freely adjusted, said pair of coordinates defining the position of the display element at which the position of the locating sensor and hence of the locating apparatus is fixed and displayed in relation to the displayed portion of the map information item.

In a preferred embodiment of the locating system, the display apparatus is provided to track, in the displayed portion of the map information item, a current position of the locating sensor in accordance with a repositioning of the locating apparatus in relation to the examination surface. Hence, a user of the locating system may correlate the current position of the locating apparatus directly with the displayed portion of the map information item since a marked position of the locating sensor on the displayed map information item is modified in a manner dependent on the repositioning of the locating apparatus in relation to the examination surface. Preferably, the portion of the map information item displayed thereby is substantially maintained, unless the user, with the locating apparatus, leaves the region of the examination surface reproduced in the displayed portion of the map information item.

Preferably, the user of the locating system is able to change between the two depiction options, for example by changing the system settings of the locating system.

In an alternative, or additional, embodiment of the locating system, the display apparatus is provided to scale the displayed map information item in a manner dependent on the position data. As a result, a locating system which is able to be used in a particularly flexible manner may be provided since objects to be located may be located particularly quickly and locating may be restricted to a particularly relevant region. In particular, in this context, scaling should be understood to mean that the display apparatus adapts an imaging scale and, in particular, increases and/or refines the resolution and makes smaller details visible. Alternatively, or additionally, the display apparatus may also adapt an imaging scale in such a way that the resolution is reduced and fewer small details are visible. An imaging scale should be understood to mean a ratio between the extents of the map information item in the display element and the extents of an associated region of the examination surface. It is conceivable for the display apparatus to determine the imaging scale in a manner dependent on all detected position data or for the display apparatus to determine the imaging scale in a manner dependent on most recently detected position data and increase the imaging scale if the user moves the locating apparatus in a restricted region of the examination surface. Here, "most recently" should be understood to mean within a determinable past time interval, for example within the respectively last 30 seconds or the like.

In an alternative, or additional, embodiment of the locating system, the display apparatus is provided to scale the depicted portion of the map information item in a manner dependent on a displacement speed and/or modify a resolution. As a result, it is possible to provide a locating system which is able to be used in a particularly flexible manner since objects to be located may be located particularly quickly and locating may be restricted to a particularly relevant region. Alternatively, or additionally, the display apparatus may also adapt an imaging scale in such a way that the resolution is reduced and fewer small details are visible. An imaging scale should be understood to mean a ratio between the extents of the map information item in the display element and the extents of an associated region of the examination surface. It is conceivable for the display apparatus to determine the imaging scale in a manner dependent on all captured position data or for the display apparatus to determine the imaging scale in a manner dependent on most recently captured position data and increase the imaging scale if the user moves the locating apparatus in a restricted region of the examination surface. "Most recently" should be understood to mean within a past predeterminable time interval, for example within the respectively last 30 seconds or the like.

In an alternative, or additional, embodiment of the locating system, the display apparatus is provided to scale the depicted portion of the map information item in a manner dependent on a displacement speed and/or modify a resolution. As a result, it is possible to provide a locating system which is able to be used in a particularly flexible manner since objects to be located may be located particularly quickly and locating may be restricted to a particularly relevant region. Preferably, high displacement speed corresponds to a small imaging scale and the display apparatus shows a large region of the examination surface in the display element, while a low displacement speed corresponds to a large imaging scale and the display apparatus shows a small region of the examination unit with a correspondingly higher and/or more refined resolution.

In a preferred embodiment of the locating system, the display apparatus is provided to modify, in particular displace, magnify, reduce, rotate or the like, the displayed portion of the map information item manually, i.e. depending on a user input. In this manner, the user of the locating system is provided with the option of obtaining a detailed overview of the located objects to be located, in particular after the locating has been carried out. By way of example, the user may look at the regions of the map information item, in particular of the map, of interest to him in detail, i.e. in a magnified manner. Changing the displayed portion of the map information item, in particular displacing, magnifying, reducing, rotating the displayed portion of the map information item or the like, may be realized using e.g. the input apparatus, the output apparatus or else using the position sensor as an input aid. In this manner, the user of the locating system may bring about a change in the displayed portion of the map information item, for example by displacing the locating apparatus on the examination surface, which, in a manner analogous to carrying out the actual locating, allows them to evaluate already established map information items off-line and therefore to evaluate the objects to be located which are concealed under the examination surface off-line.

In an alternative or additional embodiment of the locating system, the display apparatus may be provided to project the map information item onto the examination surface such that this allows an arrangement of the object to be located to be displayed directly on the examination surface. Potential errors in the spatial assignment of the locating data by way of the user may advantageously be avoided in this manner. Furthermore, a particularly high level of operating comfort is obtained since a user of the locating system need merely concentrate on the examination surface during the locating process and need not alternately look at the examination surface and the display apparatus.

In a preferred embodiment of the locating system, the display apparatus is provided to depict a mark in the displayed portion of the map information item, said mark being assigned to a feature of the locating apparatus, in particular of the locating appliance, and therefore representing the position of this feature in the depicted map information item. In particular, the feature may be the center of the locating sensor, the silhouette of the locating apparatus, in particular of the locating appliance, a defined marking apparatus, in particular an indication point, of the locating apparatus, in particular of the locating appliance, or the like. In this manner, the position of the feature of the locating apparatus, in particular of the locating appliance, may be related directly to the depicted portion of the map information item in a simple and unambiguous manner. By way of example, it is thus possible to relate a marking apparatus, in particular an indication point, of the locating apparatus, in particular of the locating appliance, which is provided for labeling or marking a position of interest on the examination surface, to the portion of the map information item displayed by the display apparatus. By way of example, if the mark representing the marking apparatus, in particular the indication point, is situated over an object to be located in the depicted map information item, the marking apparatus, in particular the indication point, of the locating apparatus, in particular of the locating appliance, is likewise, in relation to the examination surface, situated over the object to be located.

In particular, an "indication point" should be understood to mean a recess provided in the locating apparatus, in particular in the locating appliance, said recess serving to indicate in a defined manner, e.g. by means of a pen, a label or position mark on the examination surface.

Furthermore, it is conceivable that a user of the locating system is able to select and/or switch between different marks which are assigned to different features of the locating apparatus, in particular of the locating appliance. Therefore, in particular, provision may be made in one embodiment of the locating system for a selection to be made, and/or switch to be carried out, between different marking apparatuses, in particular indication points, which e.g. are provided at different positions of the locating apparatus, in particular of the locating appliance.

In one embodiment of the locating system, provision may also be made for a selection or switching between various marks to be initiated by the locating system, for example depending on a direction of the repositioning of the locating apparatus, in particular of the locating appliance.

In an alternative or additional embodiment of the locating system, the display apparatus may be provided to output a warning signal depending on the position data in order to restrict a locating process to a set examination range in a particularly simple and intuitive manner which is not susceptible to errors. To this end, the evaluation apparatus preferably has an examination range which may be set by a user and said evaluation apparatus is provided to output a warning signal if the currently captured position data are arranged in an edge region of the examination range or are arranged outside of the examination range.

In a further alternative or additional, preferred embodiment of the locating system, the display apparatus may be provided to output a warning signal depending on a displacement speed of the locating sensor. This may advantageously be used to ensure a high data quality of the map information item. Preferably, the evaluation apparatus is provided to output a warning signal if the displacement speed exceeds an upper threshold. In principle, it is also conceivable for the evaluation apparatus to be provided to terminate the locating process and display this to the user. In this context, an upper "threshold" should be understood to mean, in particular, a value which may be set by the user or which is due to the system and/or which is ascertained by the evaluation apparatus during the measurement process on the basis of the quality of the locating data and below which a quality of the locating data is at least satisfactory.

In an advantageous embodiment of the locating system according to the disclosure, in particular of a hand-held locating appliance, the display apparatus and/or the evaluation apparatus is provided not to display, or exclude, at least some of the locating information item when generating and/or modifying the map information item.

The evaluation apparatus is provided to exclude and, in particular, not display at least some of the locating data and/or some of the locating information item when generating and/or modifying the map information item. A multiplicity of embodiments are conceivable, in which some of the locating data and/or some of the locating information item are respectively excluded and, in particular, not displayed when generating and/or modifying the map information item. In particular, a multiplicity of criteria and/or routines are conceivable, which may lead to an exclusion of some of the locating data and/or some of the locating information item from being displayed or depicted. By way of example, in one embodiment, the evaluation apparatus may be provided to compare locating data transferred by means of the locating sensor with a value range to be expected, with, in particular, e.g. stored locating data and/or locating data which were already ascertained for adjacent regions in relation to the examination surface. Using an evaluation prescription, it is then possible to provide a value for a data quality, preferably depending on a deviation of the locating data from one another or depending on a comparison between the locating data and the value range to be expected. The evaluation prescription further considers data of the position sensor and checks whether the locating data may be reliably assigned to the position data. The evaluation apparatus consequently excludes locating data depending on the ascertained data quality and excludes locating data which are not reliably assignable to position data when generating and/or modifying the map information item.

In an advantageous embodiment of the locating system according to the disclosure, the locating system is configured as a hand-held locating appliance comprising a housing housing at least a locating apparatus, an evaluation apparatus, a control apparatus, a position sensor and a display apparatus.

Preferably, the locating appliance has a housing which receives at least the essential functional components of the locating system. Preferably, the housing receives at least a control apparatus, a locating apparatus, a position sensor, an evaluation apparatus, an input and/or output apparatus, a memory apparatus and also an energy supply apparatus. In particular, in terms of the overall volume thereof, more than 50%, preferably more than 75%, particularly preferably 100% of the components are housed in the housing of the locating appliance. Preferably, the hand-held locating appliance may have a handle or handle region, by means of which the locating appliance may be guided over the examination surface of the article to be examined. The mass of the hand-held locating appliance is less than 5 kg in particular, advantageously less than 3 kg and particularly advantageously less than 1 kg. In this way, it is possible to realize a compact locating appliance that is easily guidable in one hand. Furthermore, this allows the components to be advantageously protected against damage and environmental influences, for example against moisture and dust.

Alternatively, a locating system with a manually guided locating apparatus comprising a locating sensor and a position sensor is proposed.

Moreover, a manually guided locating apparatus is proposed, comprising a locating sensor, a position sensor and comprising a display apparatus of a locating system according to the disclosure. As a result, it is possible to provide a particularly compact and flexibly usable locating apparatus. In this context, a locating apparatus should be understood to mean, in particular, a unit comprising a housing which receives at least the locating sensor, the position sensor, the evaluation apparatus and the display apparatus.

Furthermore, a method according to the disclosure for locating objects to be located which are concealed under an examination surface is proposed, in which at least two modes of operation of a locating system are selectable, wherein an evaluation apparatus is provided, in the first mode of operation, to determine and/or provide direction-resolved and/or spatially resolved locating information items without repositioning the locating apparatus and, in the second mode of operation, to determine and/or provide an at least three-dimensional locating information item by assigning locating data to position data of a position sensor. In particular, the method allows the examination of an examination surface in respect of objects to be located which are concealed under the examination surface using the two modes of operation according to the disclosure.

In a preferred embodiment of the method, the method may, in particular, be characterized by at least one of the following steps:
 identifying or detecting a placement of the hand-held locating apparatus on an examination surface by means of the placement identification apparatus;
 selecting the first mode of operation by the control apparatus upon, or as a consequence of, identifying a placement of the locating apparatus on the examination surface;
 ascertaining locating data with directional and/or spatial resolution in respect of objects to be located which are concealed under an examination surface using a locating sensor of the hand-held locating apparatus which has a directional and/or spatial resolution in a predeterminable detection zone, in particular direction-resolved and/or spatially resolved locating at the point of placement of the locating apparatus on the examination surface without repositioning the locating apparatus in relation to the examination surface;
 determining and providing a direction-resolved and/or spatially resolved locating information item on the basis of locating data ascertained by the direction-resolving and/or spatially resolving locating sensor using the evaluation apparatus;
 depicting a locating information item, in particular an at least two-dimensional map information item, using a display apparatus; preferably depicting an at least two-dimensional map;
 identifying a change in position of the locating apparatus in relation to the examination surface using a position sensor;
 switching the locating system into the second mode of operation upon, or as a consequence of, identifying a change in position of the locating apparatus, initiated by the control apparatus;
 determining and providing an at least three-dimensional locating information item from the locating data and the position data of the position sensor by assigning locating data to position data;
 determining and providing, preferably in real time, an at least two-dimensional map information item, in particular a map, from the at least three-dimensional locating information items using the evaluation apparatus;
 depicting a locating information item, in particular an at least two-dimensional map information item, using the display apparatus, preferably depicting an at least two-dimensional map;
 wherein
 locating data and/or locating information items are interpolated and/or extrapolated by the evaluation apparatus;

locating information items determined in the first mode of operation and in the second mode of operation are combined by the evaluation apparatus;

already determined locating information items, in particular locating information items determined in the first mode of operation, are complemented and/or updated and/or refined and/or overwritten using the evaluation apparatus when repositioning the locating apparatus, in particular when once again passing over a region of the examination surface;

the displayed portion of a map information item is varied by the display apparatus depending on position data and/or depending on the mode of operation;

at least some of the locating information item is not displayed by the evaluation apparatus and/or the display apparatus when generating and/or modifying the map information item.

BRIEF DESCRIPTION OF THE DRAWINGS

The disclosure is explained in more detail in the subsequent description on the basis of exemplary embodiments depicted in the drawings. The drawing and the description contain several features in combination. Expediently, a person skilled in the art will also consider the features independently and combine these into sensible further combinations. In the figures, the same reference signs denote the same elements.

In detail.

DETAILED DESCRIPTION

Figure 1:
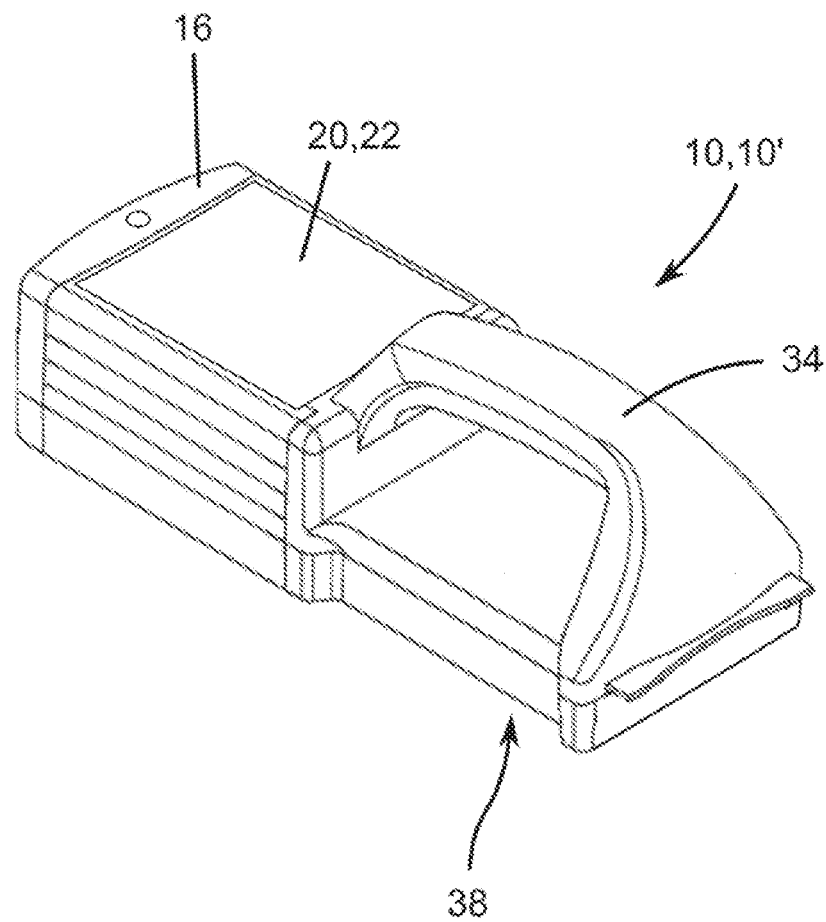
FIG. 1 shows a perspective side view of a configuration of a locating system according to the disclosure.
Figure 2:
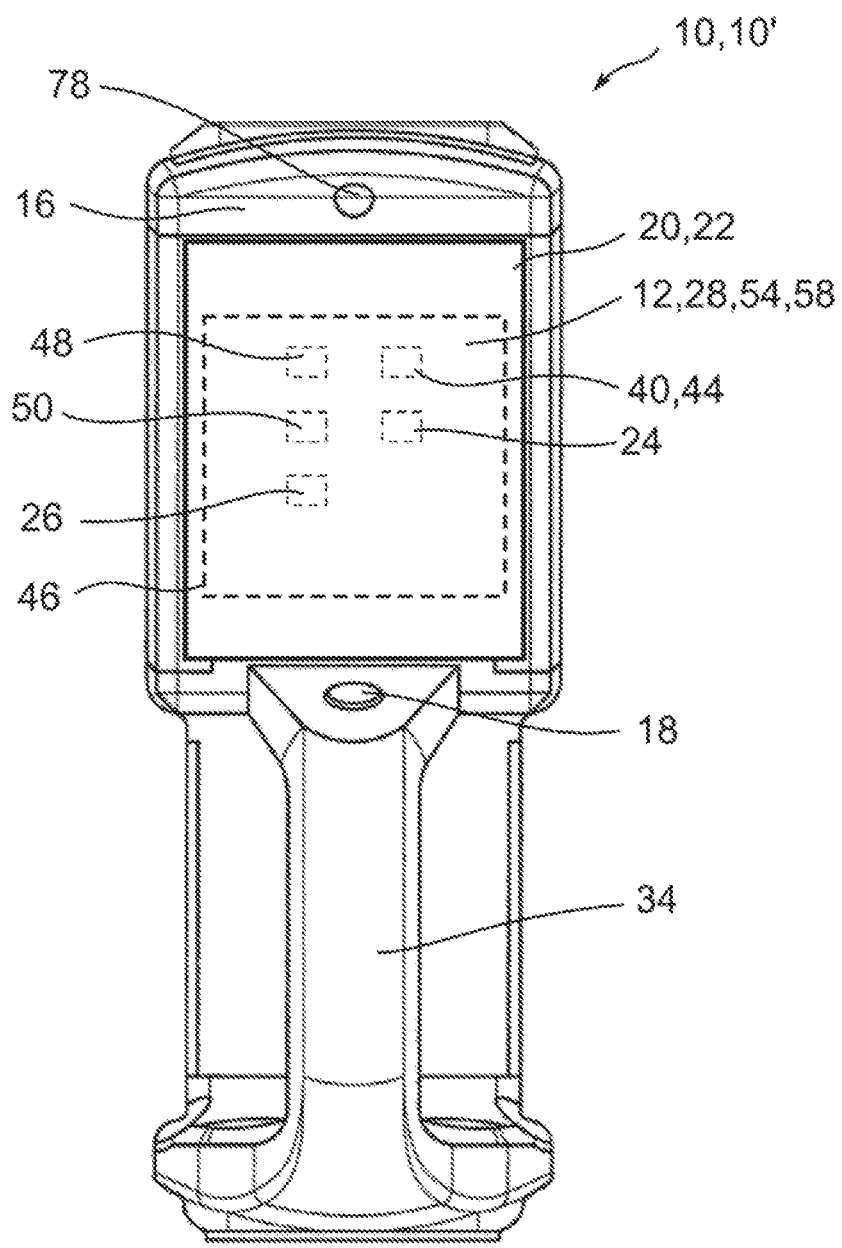
FIG. 2 shows a plan view of the same configuration of the locating system according to the disclosure.

FIG. 1 and FIG. 2 show two views of an exemplary embodiment of a locating system 10 according to the disclosure, in a perspective side view and a simplified, schematic plan view. The depicted locating system 10 is realized as a hand-held locating appliance 10'. The following exemplary embodiments of the locating system 10 all relate to an embodiment of the locating system 10 as a hand-held locating appliance 10', and so the two terms locating system 10 and locating appliance 10' are used synonymously below. All described features of a locating appliance 10' are likewise transferable to alternative embodiments of the locating system 10 according to the disclosure.

In the exemplary embodiment depicted below, the locating apparatus 12 is realized as part of a locating appliance 10' advantageously comprising all components of the locating system 10. Hence, the locating appliance 10' has a locating apparatus 12 according to the disclosure. If reference is made below to e.g. "identifying a change in position of the locating appliance 10' in relation to the examination surface 14", this is, in particular, also transferable to the locating apparatus 12 within the meaning of "identifying a change in position of the locating apparatus 12 in relation to the examination surface 14".

The locating appliance 10' configured in an exemplary manner has a housing 16, an input apparatus in the form of actuating elements 18, suitable for switching the locating appliance 10' on and off, and a touch-sensitive display element 20 for starting and configuring a measuring process and for inputting work parameters. The touch-sensitive display element 20 is part of a display apparatus 22 which serves to depict and output work parameters and/or evaluation results, in particular locating information items.

The input apparatus, consisting of actuating elements 18 and the touch-sensitive display element 20, serves for the inputting of work parameters by a user of the locating appliance 10'. The components of the input apparatus are connected to an evaluation apparatus 24 and/or a control apparatus 26 for transmitting user inputs. The evaluation apparatus 24 and/or the control apparatus 26 is/are provided to evaluate the user inputs and adapt parameters for generating and modifying a locating information item. By way of example, color scales, an assignment of a color scale, an imaging scale, a sensitivity of the locating sensor 28 or the like may be defined or adapted by way of a user input.

The display apparatus 22 is provided to depict a locating information item, in particular at least a portion of a two-dimensional map information item, preferably an at least two-dimensional map information item 32 or map. The display apparatus 22 is connected to the evaluation apparatus 24 for transmitting locating information items. The display apparatus 22 is provided to display an at least two-dimensional map information item 32, preferably display this true to scale. The display apparatus 22 is further provided to display an entire two-dimensional map information item 32 in one operating state. The display apparatus 22 has a display element 20 for displaying an at least two-dimensional map information item. In the present exemplary embodiment, the display element 20 is embodied as a color-capable OLED display. The display apparatus 22 is embodied as part of the locating appliance 10' and integrated into the housing 16 of the locating appliance 10'. The evaluation apparatus 24 is connected to the display apparatus 22 for transmitting output values. In principle, it is also conceivable for the display apparatus 22 to be embodied separately from the locating appliance 10' and to be connected via a wireless connection for transmitting output values, for example by way of a point-to-point ad hoc connection, a WLAN connection, a Bluetooth connection or the like. The portion of an at least two-dimensional map information item displayed by the display apparatus 22, in particular by the display element 20, has an imaging scale which corresponds to a ratio of the extents of the map information item in the display element 20 to the extents of an assigned region of the examination surface 14. The imaging scale has the same imaging scale for a first direction and for a second direction which, in particular, is orthogonal to the first direction. The display of an at least two-dimensional map information item is, in particular, independent of the orientation of the locating appliance 10' on the examination surface. Hence, the depicted at least two-dimensional map information item depicts the objects 30 to be located, which are located under the examination surface 14, in the correct position independently of the orientation of the locating appliance 10'. Preferably, the depicted at least two-dimensional map information item is rotated counter to the direction of the rotational movement when rotating the locating appliance 10' such that the depicted at least two-dimensional map information item reproduces the objects 30 to be located, which are located under the examination surface 14, true to position even when rotating the locating appliance 10'.

The display apparatus 22 is provided to display an ascertained locating direction of an object 30 to be located relative to the locating sensor 28. In principle, it is conceivable for the display apparatus 22 to be provided to output or depict further necessary, useful and/or expedient information items, for example to output a locating direction, a locating accuracy, a symbolism simplifying an interpretation of a locating information item, operating instructions or the like. Preferably, the display apparatus 22 may, to this end, also have further display elements 20' in a further embodiment, which further display elements are embodied separately from the display element 20 for the locating and/or map information item.

Advantageously, direction-resolved and/or spatially resolved locating information items ascertained using the first mode of operation and/or the second mode of operation may be depicted as at least two-dimensional map information item 32, in particular as a two-dimensional map, by means of the display apparatus 22 of the locating system 10. For transportation purposes and for the guidance thereof, the locating appliance 10' further comprises a handle 34. The handle 34, the actuating elements 18 and the display element 20 are situated on a housing side of the locating appliance 10' which typically faces the user when operating the locating appliance 10'.

For the purposes of supplying the locating appliance 10' with energy, the locating appliance 10' has a recess on the appliance rear side 36, i.e. the appliance side lying opposite to the appliance side receiving the display element 20 on the appliance rear side, said recess being provided for receiving at least one power-mains-independent energy store 38, in particular batteries or rechargeable accumulators. The locating appliance 10' presented in an exemplary manner comprises lithium ion accumulators, the high energy and power density of which is advantageously suitable for supplying the locating appliance 10' with energy. In an alternative embodiment, the energy store 38 may also be housed in the handle 34 of the locating appliance 10'. Preferably, the energy store 38 has a detachable interlocking and/or force-fit connection interface such that the at least one energy store 38 is arrangeable in or on the locating appliance 10' in a removable and replaceable manner. Moreover, the energy store 38 may be supplied and charged with power from mains power when within and/or outside of the locating appliance 10'.

The locating system 10' comprises a position sensor 40, which is provided to capture position data, assignable to the locating data, of the locating apparatus 12 in relation to the examination surface 14. In an assembled state of the locating appliance 10', the position sensor 40 is received in the housing wall on the appliance rear side 36. Preferably, the position sensor 40 is connected to the housing 16 of the locating appliance 10' in such a way that the locating sensor 28 and the position sensor are arranged with an at least substantially fixed relative position in relation to one another. By means of the position sensor 40, the locating appliance 10' is able to detect a change in alignment and/or change in position of the locating appliance 10' in relation to the examination surface 14 of a workpiece 42 to be examined (cf., also, FIG. 3). The position sensor 40 captures, in particular, a movement of the locating appliance 10' and a traveled distance and/or direction and therefore allows measurement results, in particular locating data, to be related to a position of the locating appliance 10', in particular in relation to the examination surface 14. In particular, the position sensor 40 moreover renders it possible to detect a rotation of the locating appliance 10' about an axis which extends perpendicular in relation to the examination surface 14 and through the center point of the locating sensor 28. In the depicted exemplary embodiment, the position sensor 40 is embodied as an optical position sensor 40, in particular as an optical displacement transducer, which is arranged in the housing wall of the appliance rear side 36 facing the workpiece 42 to be examined when using the locating appliance 10'. Furthermore, the position sensor 40 is configured to detect a placement and removal of the locating appliance 10' onto, or from, the examination surface 14. In this way, the position sensor 40 serves simultaneously as a placement identification apparatus 44 of the locating appliance 10', in particular of the locating apparatus 12, for detecting a placement and removal of the locating appliance 10', and hence of the locating apparatus 12, onto, or from, the examination surface 14.

Alternatively, or additionally, the position sensor 40 comprises two laser light sources (not depicted in any more detail) in an embodiment of the locating appliance 10', the radiation directions of said laser light sources being arranged perpendicular to one another in a plane parallel to the examination surface 14. In this embodiment, the position sensor 40 is provided to determine a distance of the locating sensor 28 from further building parts, for example from a building floor, a building ceiling or a building wall, by determining a phase angle of an emitted light beam in relation to a reflected light beam. In the present exemplary embodiment, the position sensor 40 is provided to determine a position of the locating sensor 28 in absolute terms, i.e. determining the position is independent of a position assumed by the locating sensor 28 immediately therebefore.

Advantageously, the locating system 10 has a coordinate system not depicted in any more detail, said coordinate system being provided as a reference system for the position data. The coordinate system may be embodied as an orthogonal coordinate system. The position sensor 40 ascertains and transmits the position data in relation to an origin of the coordinate system. The locating system 10 is provided to assign the origin of the coordinate system to a reference point on the examination surface 14 on the basis of a user input. In principle, it is also conceivable for the reference point to be arranged away from the examination surface 14. The position data preferably form a position coordinate pair consisting of an x-value and a y-value.

The change in position of the locating appliance 10' as a consequence of a repositioning, in particular a displacement or shifting of the locating appliance 10' on the workpiece 42, is ascertained after placing the locating appliance 10' onto the examination surface 14 of a workpiece 42 to be measured, for example onto a wall 42' or onto a concrete floor. These position data are forwarded to an evaluation apparatus 24 for further evaluation purposes.

Particularly advantageously, multidimensional depictions of the measurement results, for example in particular in the form of an at least two-dimensional map information item 32 and/or a pseudo-three-dimensional depiction (cf., in particular, FIG. 7) may be generated by means of position-dependent measurement and evaluation of an examination surface 14.

Additionally, or alternatively, photographic, inclination-sensitive, angle-sensitive, translation-sensitive, acceleration-sensitive and rotational-rate-sensitive sensors, in particular, may also be present for the purposes of determining the position more precisely, in particular also for determining the position in a relative manner.

Figure 3:
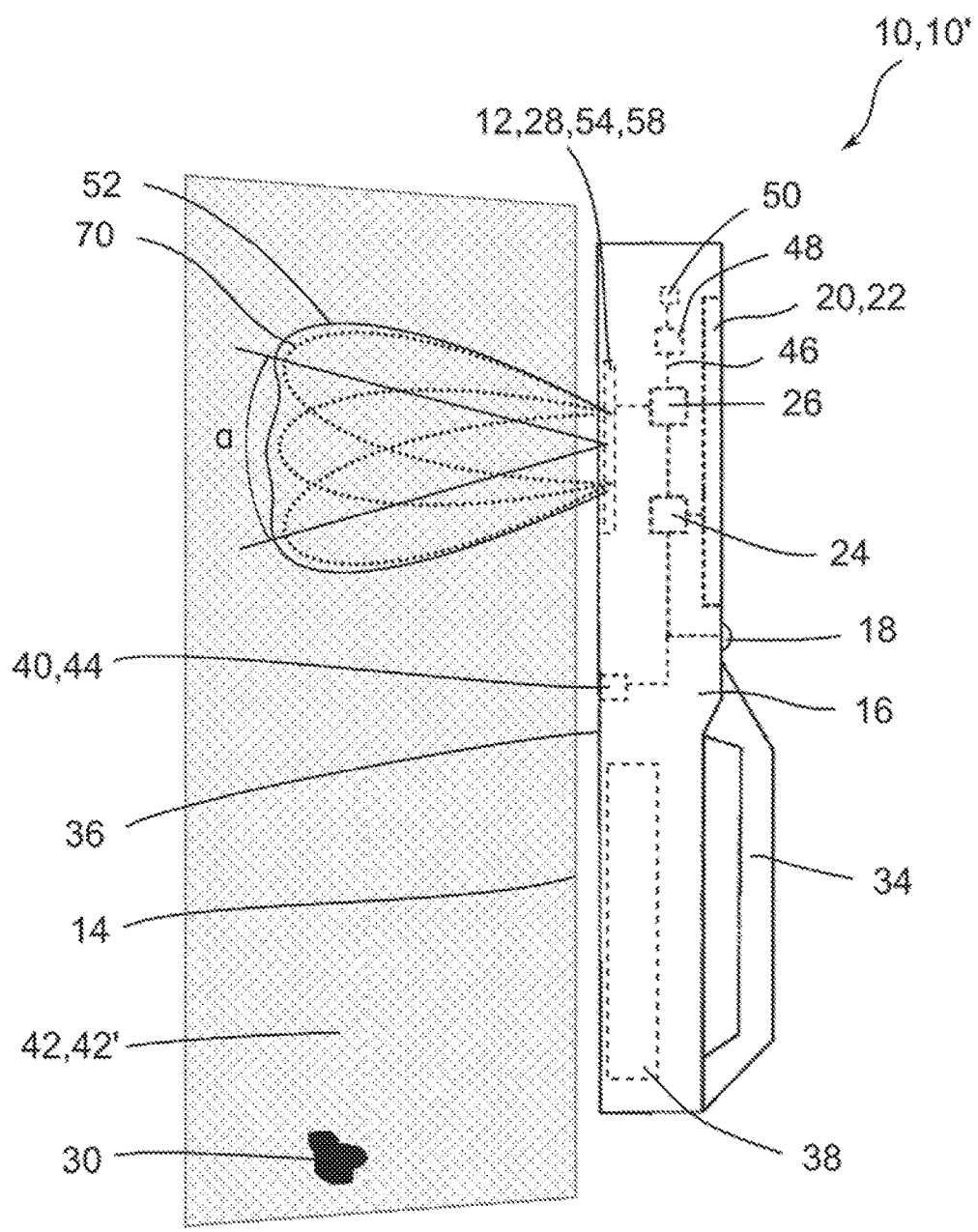
FIG. 3 shows a schematic side view of a configuration of a locating system according to the disclosure.
Figure 4:
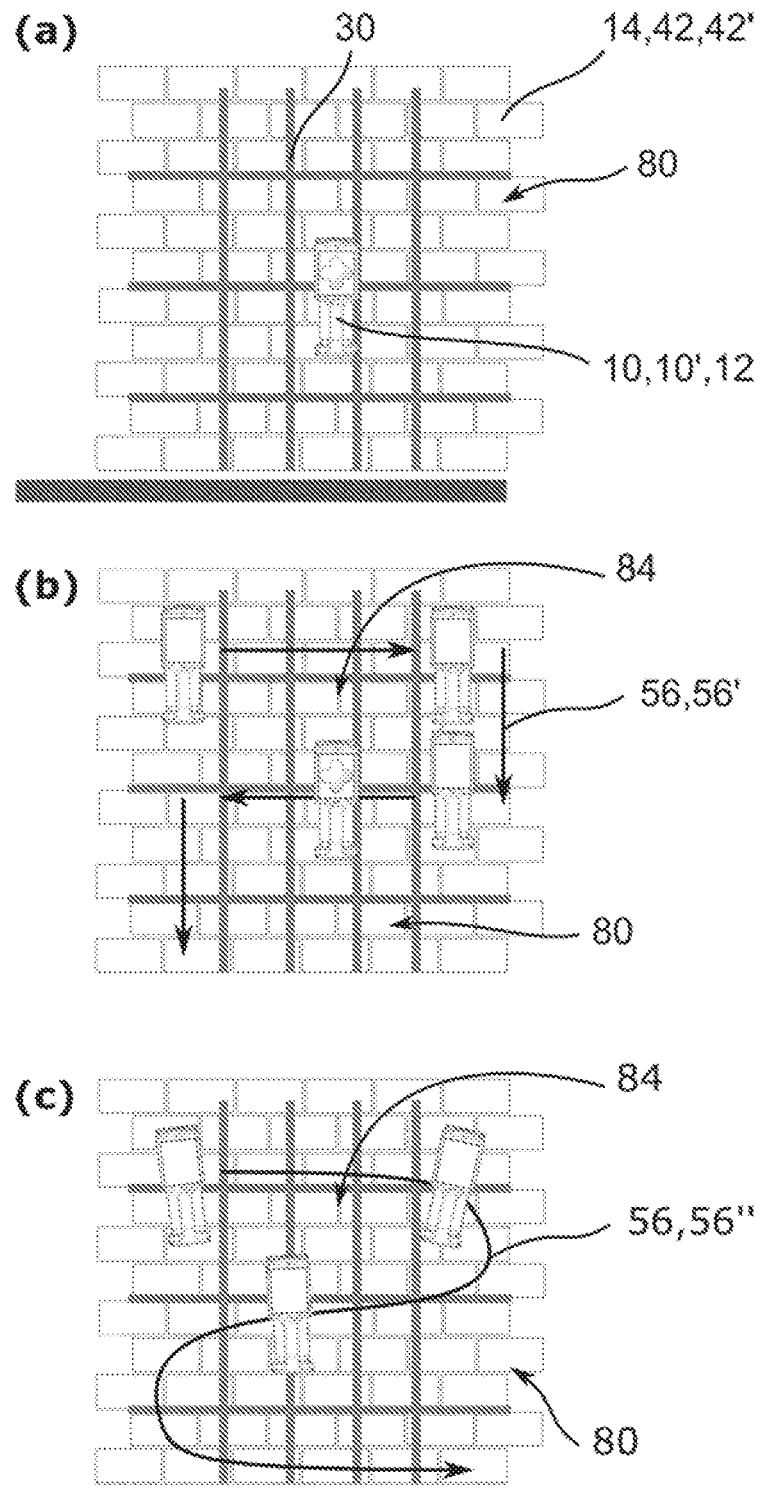
FIG. 4 shows a schematic illustration of an embodiment of the locating system used on an examination surface using the two modes of operation.

Further components of the locating appliance 10', in particular the locating apparatus 12, the control apparatus 26, the evaluation apparatus 24 and a data communication interface 48, connected to the control apparatus 26 and/or the evaluation apparatus 24, and a memory apparatus 50 are housed on a carrier element 46 of the locating appliance 10', in particular on a system circuit board or printed circuit board within the housing 16 (see, in particular, FIG. 2 and FIG. 3).

The control apparatus 26 has control electronics comprising means for communicating with the other components of the locating appliance 10', for example means for open-loop and/or closed-loop control of the locating apparatus 12 and means for controlling the locating appliance 10'. In particular, the control apparatus 26 comprises a unit (not depicted in any more detail) comprising a processor unit, a memory unit and an operating program stored in the memory unit. The control apparatus 26 is provided to adjust at least one operating function parameter of the locating appliance 10' depending on at least one input by the user, by the evaluation apparatus 24 and/or by the data communication interface 48.

In particular, the control apparatus 26 is embodied to automatically select a mode of operation of the locating system 10 and automatically switch between modes of operation of the locating system 10. Switching the locating system 10 into the first mode of operation is initiated by the control apparatus 26 as soon as the control apparatus 26 receives a signal reporting the detection of a placement of the locating apparatus 12, in particular of the locating appliance 10', on the examination surface 14 from the placement identification apparatus 44. Moreover, the control apparatus 26 initiates switching of the locating system 10 into the second mode of operation when a change in position of the locating appliance 10', in particular the locating apparatus 42, is identified in relation to the examination surface 14. The sensitivity with which a movement of the locating appliance 10' is identified as a change in position is predeterminable by the user of the locating system 10. Furthermore, the user of the locating system 10 may also manually select a mode of operation of the locating system 10 to be used and/or deactivate the automatic switching of modes of operation.

The evaluation apparatus 24 is connected to the locating sensor 28 and the position sensor 40 for transferring data and provided to evaluate locating data of the locating sensor 28. To this end, the evaluation apparatus 24 has at least one processor and a memory (not depicted in any more detail) with an operating program which is stored thereon and executable. Particularly advantageously, the evaluation apparatus 24 has stored correction and/or calibration tables which render it possible to interpret, convert, interpolate and/or extrapolate evaluation results and calibrate the locating appliance 10', in particular the evaluation routines. Furthermore, the evaluation apparatus 24 is signal-connected to the data communication interface 48 and the display apparatus 22, in particular the display element 20. For further use, evaluation results, in particular locating information items derived from the locating data, are output from the evaluation apparatus 24 by way of the control apparatus 26 to either the memory device or, for transmission of the data, the data communication interface 48 or directly to a user of the locating appliance 10'. An output to a user may, in particular, be effected by means of the display apparatus 22, i.e. by a depiction on the display element 20. The output on the display element 20 may be graphical, numerical and/or alphanumerical, for example in the form of a measured value, a measurement curve, a signal profile, a time profile, as image data, in a gradient depiction, by means of symbols and in a combination thereof (cf., in particular, FIGS. 6, 7, 8). Alternatively, or additionally, a depiction by means of a signal indicator is possible, for example in particular by way of a light-emitting diode which e.g. evaluates a target variable by way of color coding (e.g. red, yellow, green).

The locating system 10, in particular the locating appliance 10', has a locating apparatus 12 which is provided to capture, with a directional and/or spatial resolution, locating data in respect of objects 30 to be located which are concealed under an examination surface 14. To this end, the locating apparatus 12 comprises at least one locating sensor 28 which is direction-resolving and/or spatially resolving in a detection zone 52. The locating apparatus 12 including the locating sensor 28 is housed in the housing 16 of the locating appliance 10' such that the locating apparatus 12 is held and protected by the housing 16 in an assembled state of the locating system 10. In the shown exemplary embodiment, the locating sensor 28 is embodied as an LCR antenna 54. The LCR antenna 54 is provided to emit electromagnetic radiation on the appliance rear side 36 facing away from a user of the locating appliance 10'. Signals reflected and/or scattered in the interior of the workpiece 42, in particular electromagnetic radiation at least partly reflected from an object 30 to be located which is concealed under the examination surface 14, is detected by means of the locating sensor 28 of the locating apparatus 12. Here, electromagnetic properties of the volume arranged under the examination surface 14 are captured at least in a detection zone 52 of the locating sensor 28. The reflections caused by the examination surface 14 are filtered out of the received signal.

Electromagnetic properties captured by means of the reflected electromagnetic radiation relate to, for example, an electric or magnetic conductivity or an electric or magnetic susceptibility of the objects 30 to be located which are concealed under the examination surface 14. The locating sensor 28 of the locating apparatus 12 is arranged in the interior of the housing 16, immediately behind the housing side facing away from the user when using the locating appliance 10'. In this way, the locating sensor 28 may advantageously be positioned close to the examination surface 14 when using the locating appliance 10', in particular when placing the locating appliance 10' onto an examination surface 14 to be examined.

Figure 5:
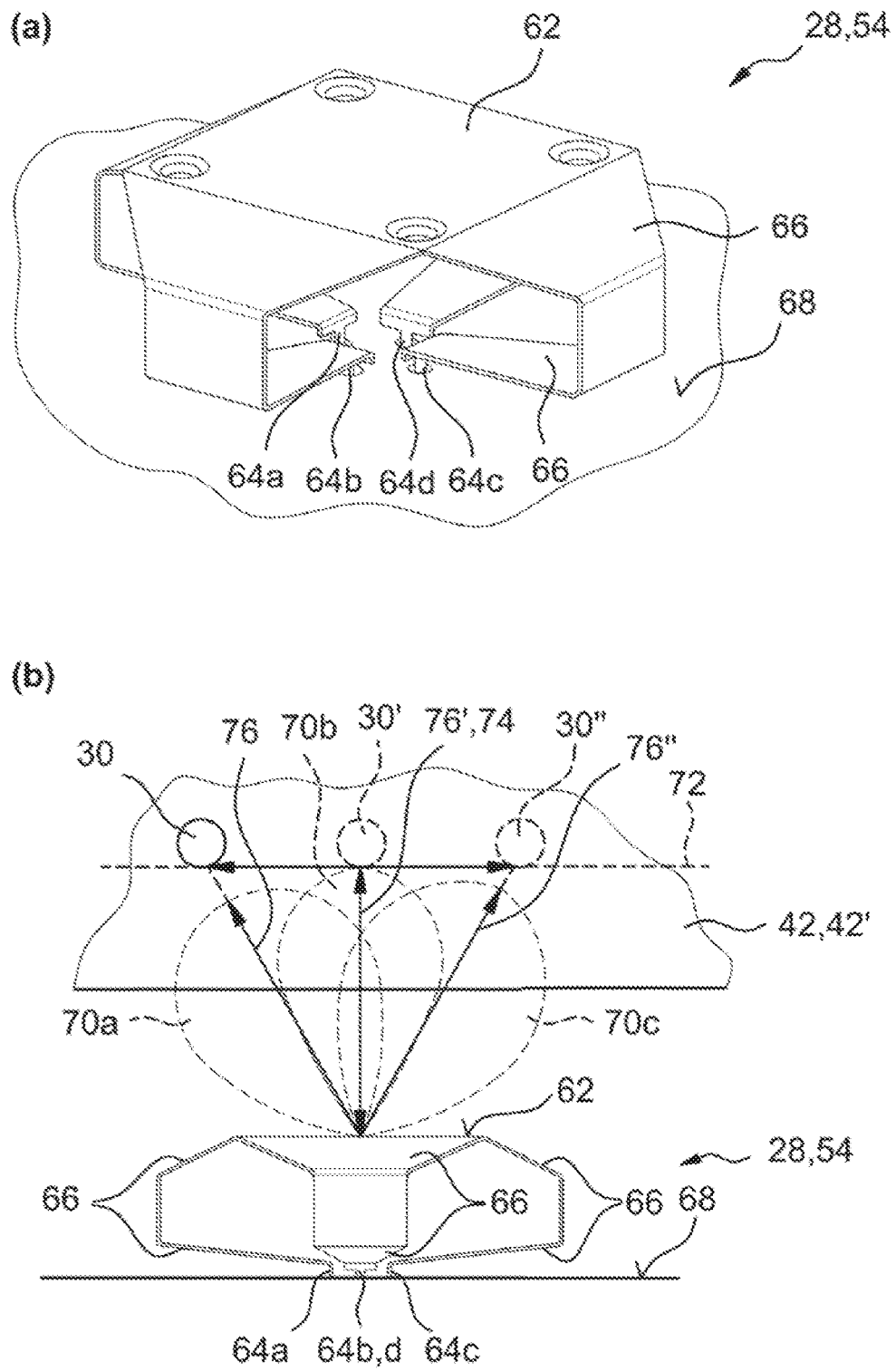
FIG. 5a shows a perspective view of an embodiment of a direction-resolving and/or spatially resolving locating sensor.
FIG. 5b shows a schematic and simplified side view of the same embodiment of the locating sensor with a schematic depiction of a direction-resolved and/or spatially resolved detection zone.

The locating sensor 28 is embodied as a direction-resolving and/or spatially resolving locating sensor 28 of the locating apparatus 12. The locating sensor 28, in particular the LCR antenna 54, has an embodiment which is electrically alignable (cf., in particular, FIG. 5b). The direction-resolving and/or spatially resolving locating sensor 28 of the locating apparatus 12 has a predeterminable, in particular selectable or adjustable, detection zone 52 (cf., in particular, FIG. 5b).

An object 30 to be located arranged in a region under the examination surface 14, for example a reinforcement, a line, a pipe, sheathing or a cavity, changes an electromagnetic field generated by the locating sensor 28 in comparison with a region which does not have such an object 30 to be located. The locating sensor 28 is provided to capture such a change in a continuous value range. These locating data, in particular physical and/or technical parameters and/or characteristics such as amplitudes, voltages, currents, pulse durations, power or the like, are forwarded to the evaluation apparatus 24, where they are evaluated and prepared by means of evaluation routines.

FIG. 3 depicts the embodiment according to the disclosure of the locating appliance 10' in FIGS. 1 and 2 in a simplified schematic side view. As depicted, the locating appliance 10' is positioned with the area of the appliance rear side 36 in the direct vicinity of the examination surface 14, in particular contacting the examination surface 14, for the purposes of carrying out a locating process of an object 30 to be located which is concealed under an examination surface 14. The examination surface 14 in FIG. 3 (and also in FIGS. 4-5, 7-8) is, for example, depicted as a surface of a building wall 42'. Here, the locating appliance 10' is provided to be guided manually on and/or over the examination surface 14. Here, the locating appliance 10' is positioned in such a way with the appliance rear side 36 in the direct vicinity of the examination surface 14 to be examined that the distance between the appliance rear side 36 and the examination surface 14 is minimized. What this achieves is that the electromagnetic radiation emitted by the locating apparatus 12 is able to penetrate into the workpiece 42 to be examined.

After placing the locating appliance 10' on the examination surface 14, the user may undertake a locating process locally, i.e. statically and without repositioning the locating appliance 10'. This is depicted in FIG. 4a and in FIG. 7. A local, i.e. static, locating process without repositioning the locating appliance 10', in particular the locating apparatus 12, is facilitated in the first mode of operation, according to the disclosure, of the locating system 10.

Alternatively, or subsequently, the user may move, in particular displace or shift, the locating appliance 10' along the examination surface 14 during the operation. This is indicated in FIGS. 4b and 4c by arrows which indicate a path 56 of a repositioning of the locating appliance 10'. In the embodiment depicted in FIG. 4b, this path 56 may correspond to a stringing together of partial paths 56' aligned perpendicular to one another. By way of example, in relation to a wall 42' to be examined, these partial paths 56' may e.g. extend horizontally and vertically. In a preferred, user-friendly and particularly intuitive embodiment, depicted in FIG. 4c, the locating appliance 10' may also be moved freely over the examination surface 14. Particularly advantageously, a movement along a predetermined, in particular rigid, path 56' is not required in this embodiment. Hence the user may guide the locating appliance, in particular the locating device 12, over the examination surface 14 in a freely performable wiping movement and examine the examination surface 14 in a simple and intuitive manner. The free wiping movement of the locating appliance results in a free path 56", in particular with any configuration, which is independent from a predetermined grid or a predetermined track for the movement or the travel. A locating process which is carried out during a repositioning of the locating appliance 10' is facilitated in a second mode of operation, according to the disclosure, of the locating system 10.

The direction-resolving and/or spatially resolving locating sensor 28 of the locating system 10, in particular of the locating appliance 10', has a predeterminable, in particular selectable or adjustable, detection zone 52. In particular, the solid angle α (cf. FIG. 3) of the detection zone is selectable or adjustable. Advantageously, the locating sensor 28 may carry out a direction-resolving and/or spatially resolving locating process within this detection zone 52, i.e. it may capture, with directional and/or spatial resolution, locating data in respect of objects 30 to be located which are concealed under an examination surface 14. In particular, the direction-resolving and/or spatially resolving locating sensor 28 is realized as a locating sensor 28 which is alignable (directable) by electric actuation in the depicted embodiment of the locating appliance 10'.

In an exemplary embodiment, the locating apparatus 12 of the locating appliance 10' is embodied as a transmission and reception unit 58 for electromagnetic radiation. The locating apparatus 12 comprises at least one LCR antenna 54 as a locating sensor 28 and a switching unit 60 for the actuation thereof. An LCR antenna 54 with an exemplary configuration is shown in a perspective side view in FIG. 5a. FIG. 5b shows the same LCR antenna 54 in a schematic side view in front of a workpiece 42 to be examined. The LCR antenna 54 has a square planar emitter 62, four interfaces 64a-d and four matching means 66. The matching means 66 in each case connect one of the interfaces 64a-d with the planar emitter 62. Two opposite interfaces 64a,c (or 64b,d) are respectively connected to the switching unit 60 in an electrically conductive manner. Alternatively, an LCR antenna 54 may also have only two interfaces 64a,c. The planar emitter 62 extends parallel to a ground surface 68 of the LCR antenna 54. The matching means 66 have a trapezoidal, in particular triangular, profile parallel to the planar emitter 62. They match a wave impedance of the planar emitter 62 to a wave impedance of lines which connect the respective two interfaces 64a,c (or 64b,d) to the switching unit 60. In an advantageous embodiment, the wave impedance of the lines is fifty ohms.

As FIG. 5b depicts in a schematic section, the LCR antenna 54 emits electromagnetic signals which penetrate into the workpiece 42 at the appliance rear side 36. FIG. 5b shows further that the LCR antenna 54 has three different transmission and/or reception characteristics 70a-c, depending on the wiring of the LCR antenna 54, in a direction parallel to the examination surface 14. In FIG. 5b, these transmission and/or reception characteristics 70a-c are schematically reproduced as transmission and/or reception lobes (antenna diagrams).

The switching unit 60 switches between three different transmission and/or reception characteristics 70a-c during operation. To this end, the switching unit 60 has a phase and/or amplitude actuator (not depicted in any more detail) and a terminating resistor. The phase member shifts the phase of a propagating signal by 180 degrees between input and output. The phase and/or amplitude actuator is securely connected to one of the interfaces 64. Alternatively, the phase and/or amplitude actuator may be interconnected differently depending on the operating state. The terminating resistor is provided to terminate one of the interfaces 64*a,c* or 64*b,c* without reflections. To this end, the terminating resistor is conductively connectable to the interfaces 64*a-d* of the LCR antenna 54.

In addition to the LCR antenna 54, an antenna controller, a signal generator, an antenna duplexer and a demodulator, which are combined in the locating apparatus 12 (not depicted in any more detail), are further provided for the purposes of operating the LCR antenna 54. The signal generator generates a transmission signal, specifically with appropriate control from the antenna controller to an evaluation of the demodulator. The antenna duplexer guides the transmission signal from the signal generator to the switching unit 60 and guides a reception signal received by the LCR antenna 54 from the switching unit 60 to the demodulator. Alternatively, a locating apparatus 12 could have separate transmission and reception antennas, of which, in particular, only a transmission and/or reception characteristic of only one transmission antenna or only one reception antenna is switched. By emitting and receiving a locating signal, the antenna controller advantageously determines the distance between the LCR antenna 54 and the object 30 to be located, but at least an item of information about an existence and/or lateral position of the object 30 to be located using the transmission and/or reception characteristics 70*a-c*.

Additionally, the antenna controller determines at least one item of information about a position of the object 30 to be located on at least one axis 72 perpendicular to a mean detection direction 74 from the signals. The switching unit 60 switches the first transmission and/or reception characteristic 70*a* by virtue of applying the transmission signal to the first interface 64*a* of the LCR antenna 54 and terminating the associated second interface 64*c* of the LCR antenna 54 without reflection. A main beam direction 76*a* of the first transmission and/or reception characteristic 70*a* is at an angle of approximately 20 degrees in a first direction relative to a mean detection direction 74 of the LCR antenna 54. The switching unit 60 switches the second transmission and/or reception characteristic 70*c* by virtue of applying the transmission signal to the corresponding second interface 64*c* of the LCR antenna 54 and terminating the associated first interface 64*a* of the LCR antenna 54 without reflection. A main beam direction 76*c* of the second transmission and/or reception characteristic 70*c* is at an angle of approximately 20 degrees in a direction opposite to the first direction relative to the mean detection direction 74 of the LCR antenna 54. The switching unit 60 switches the third transmission and/or reception characteristic 70*b* by virtue of applying the transmission signal directly to the first interface 64*a* of the LCR antenna 64 and, via the phase and/or amplitude actuator, to the second interface 64*c* of the LCR antenna 54. Here, the switching unit 60 feeds a transmission signal with two different phase angles and/or amplitudes into two interfaces 64*a,c* of the LCR antenna 54. A main beam direction 76*b* of the third transmission and/or reception characteristic 70*b* extends parallel to the mean detection direction 74 of the LCR antenna 54. Hence, the switching unit 60 is provided to switch between three transmission and/or reception characteristics 70*a,b,c* of the individual LCR antenna 54. It should be noted that the switching between transmission and/or reception characteristics likewise takes place along a second axis 70' (not depicted in any more detail) extending perpendicular to the axis 70. In this way, a direction-resolving and/or spatially resolving locating process may be carried out by a targeted actuation of the LCR antenna 54. In the shown exemplary embodiment, the entire detection zone 52 of the LCR antenna 54 may advantageously be divided into five transmission and/or reception characteristics 70*a-c* and 70*d-e* (not depicted here). Thus, a direction-resolving and/or spatially resolving locating process in at least five spatial directions or locating segments which are independent of one another is advantageously realizable by a targeted actuation of the LCR antenna 54, with the various transmission and/or reception characteristics 70*a-e* each defining a spatial direction or a locating segment. A depiction of the mutually independent locating directions or locating segments of such an LCR antenna 54, as may be output to a user, for example using the display element 20, is depicted in FIGS. 6*a-c*. A finer actuation of the LCR antenna 54, resulting in a higher number of locating directions or locating segments that are independent of one another is likewise conceivable.

The evaluation apparatus 24 of the locating appliance 10' is provided to determine and provide a direction-resolved and/or spatially resolved locating information item on the basis of locating data captured by the direction-resolving and/or spatially resolving locating sensor 28, at least in a first mode of operation of the locating system 10. In particular, the evaluation apparatus 24 is therefore provided to determine and provide a direction-resolved and/or spatially resolved locating information item from the locating data without repositioning the locating apparatus 12 in relation to the examination surface 14 (cf., in particular, FIGS. 4, 7). To this end, the evaluation apparatus 24 obtains locating data, which are captured using the direction-resolving and/or spatially resolving locating property of the LCR locating antenna 54. The evaluation results, in particular locating information items derived from the direction-resolved and/or spatially resolved locating data, are output by the evaluation apparatus 24 via the control apparatus 26 for further use, to the data communication interface 48 for transmitting the data, to the memory apparatus 50 for storing purposes or directly to a user of the locating appliance 10'. An output to a user may, in particular, be effected by means of the display apparatus 22, i.e. by a depiction on the display element 20. Here, the display apparatus 22 is provided to depict a locating information item, in particular an at least two-dimensional map information item 32, preferably as a two-dimensional map. Advantageously, direction-resolved and/or spatially resolved locating information items ascertained by the display apparatus 22 using the first mode of operation may be depicted as an at least two-dimensional map information item 32, in particular as a two-dimensional map. The output on the display element 20 may selectively be graphical, numerical and/or alphanumerical in the presented embodiment, for example in the form of a measured value, a measurement curve, a signal profile, a time profile, as image data, in a gradient depiction, by means of symbols, as a two-dimensional map and/or in a combination thereof.

Figure 6:
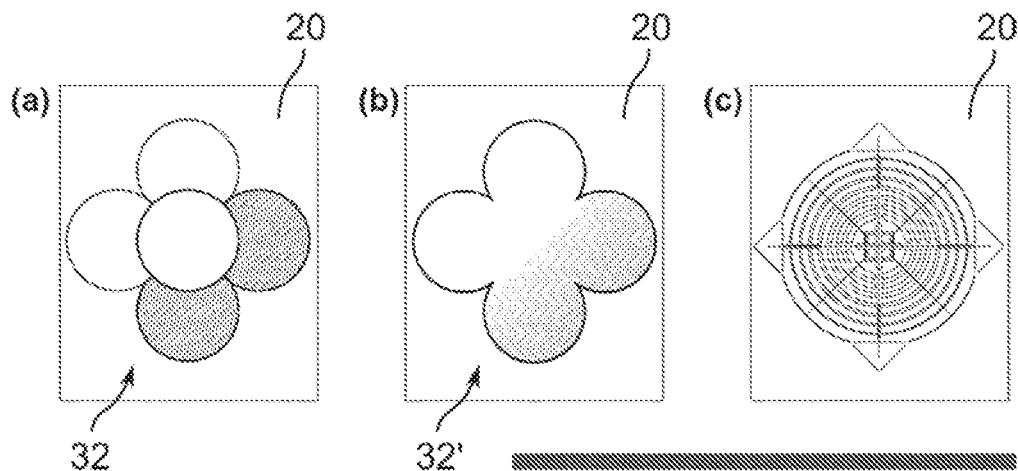
FIG. 6 shows a schematic illustration of an exemplary locating information item, in particular an at least two-dimensional map information item, displayed using a display apparatus.

FIG. 6 shows various exemplary embodiments of a two-dimensional depiction of the locating information item using the display apparatus 22. In particular, the depiction is a depiction in the form of a two-dimensional map information item 32, in particular a two-dimensional map. In FIG. 6*a*, the five transmission and/or reception characteristics 70*a-e* which are emitted or received independently of one another in each one of the five spatial directions by the locating apparatus 12 or by the LCR locating antenna 54 are depicted schematically in each case as a circle. Here, each circle represents a projection of a transmission and/or reception characteristic 70*a-e* emitted or received by the LCR antenna 54 in each one of the five spatial directions. If a locating signal is received in a transmission and/or reception direction, the locating information item ascertained therefrom is output by a hatched or color-coded area, in particular a circular area of the transmission and/or reception characteristic 70a-e belonging to this direction or this locating segment. In the embodiment depicted in an exemplary manner, a locating signal is received in two of the five directions or locating segments (to the right and bottom), depicted by color-coded (in this case: hatched) circular areas of these directions or locating segments. No locating signal is received in the three other directions or locating segments; therefore, the corresponding circular areas of these directions or locating segments remain uncolored (in this case: not hatched). The locating data forwarded from the LCR antenna 54 to the evaluation apparatus 24 are therefore ascertained without repositioning the locating apparatus 12 in relation to the examination surface 14 but merely by the targeted actuation of the direction-resolving and/or spatially resolving LCR antenna 54.

In a further embodiment, depicted in FIG. 6b, the locating data are output as interpolated locating data in the form of a two-dimensional color scale or grayscale map depiction 32' (in this case: hatching) of the locating information items. The function of the interpolation and/or extrapolation of the locating data and/or locating information items is made available by the evaluation apparatus 24 in the first and/or second mode of operation of the locating system 10.

Alternatively, a depiction by means of a signal display is conceivable, as depicted in FIG. 6c. In this signal display, a locating direction of an object 30 to be located relative to the locating sensor 28 is output to a user by way of color-coded elements. In particular, this depiction may also be output using a further display element 20' with a separate embodiment from the display element 20 in an alternative embodiment of the locating system 10.

Figure 7:
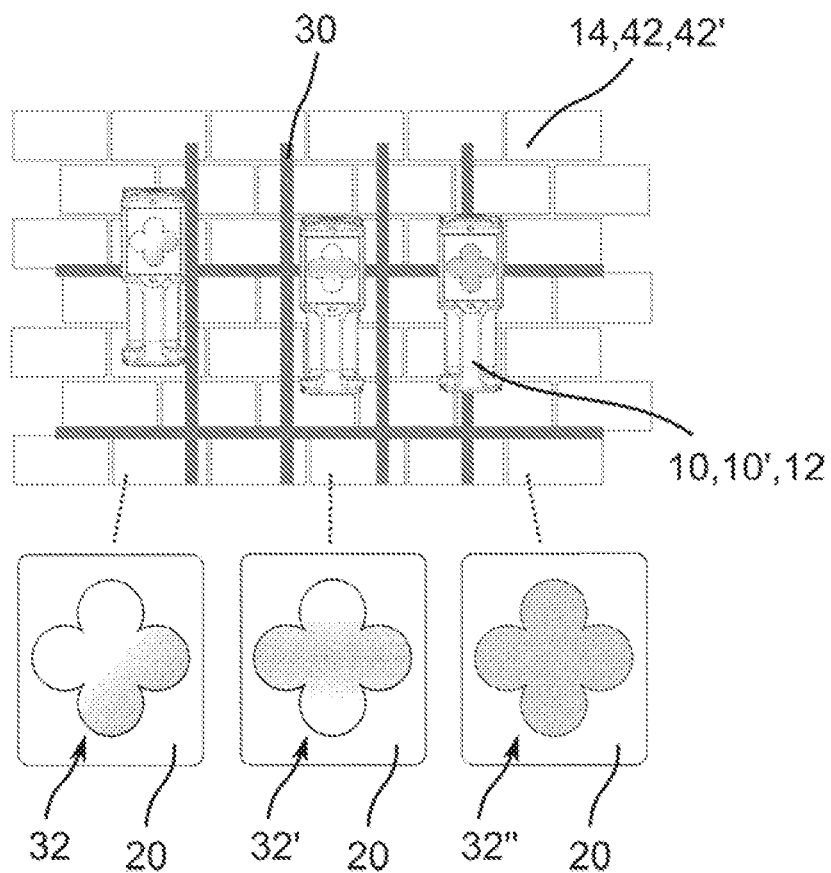
FIG. 7 shows a schematic illustration of an embodiment of the locating system used at an examination surface using the first mode of operation, FIGS. 8a, c, e, g show a schematic illustration of an embodiment of the locating system used at an examination surface using the first mode of operation and second mode of operation, FIGS. 8b, d, f, h show a schematic illustration of an embodiment of the at least two-dimensional map information item displayed using the display apparatus.

On the basis of three different positions of the locating appliance 10' on an examination surface 14, and hence in relation to an object 30 to be located, FIG. 7 shows the effect of the changed locating information item on a depiction of the locating information item using an interpolated two-dimensional map depiction 32. In particular, it is possible to identify that the two-dimensional map depiction 32 reproduces the locating information item, in particular a presence of an object 30 to be located, in this case the presence of a reinforcement situated in an examined wall, in an intuitively understandable manner.

Figure 8:
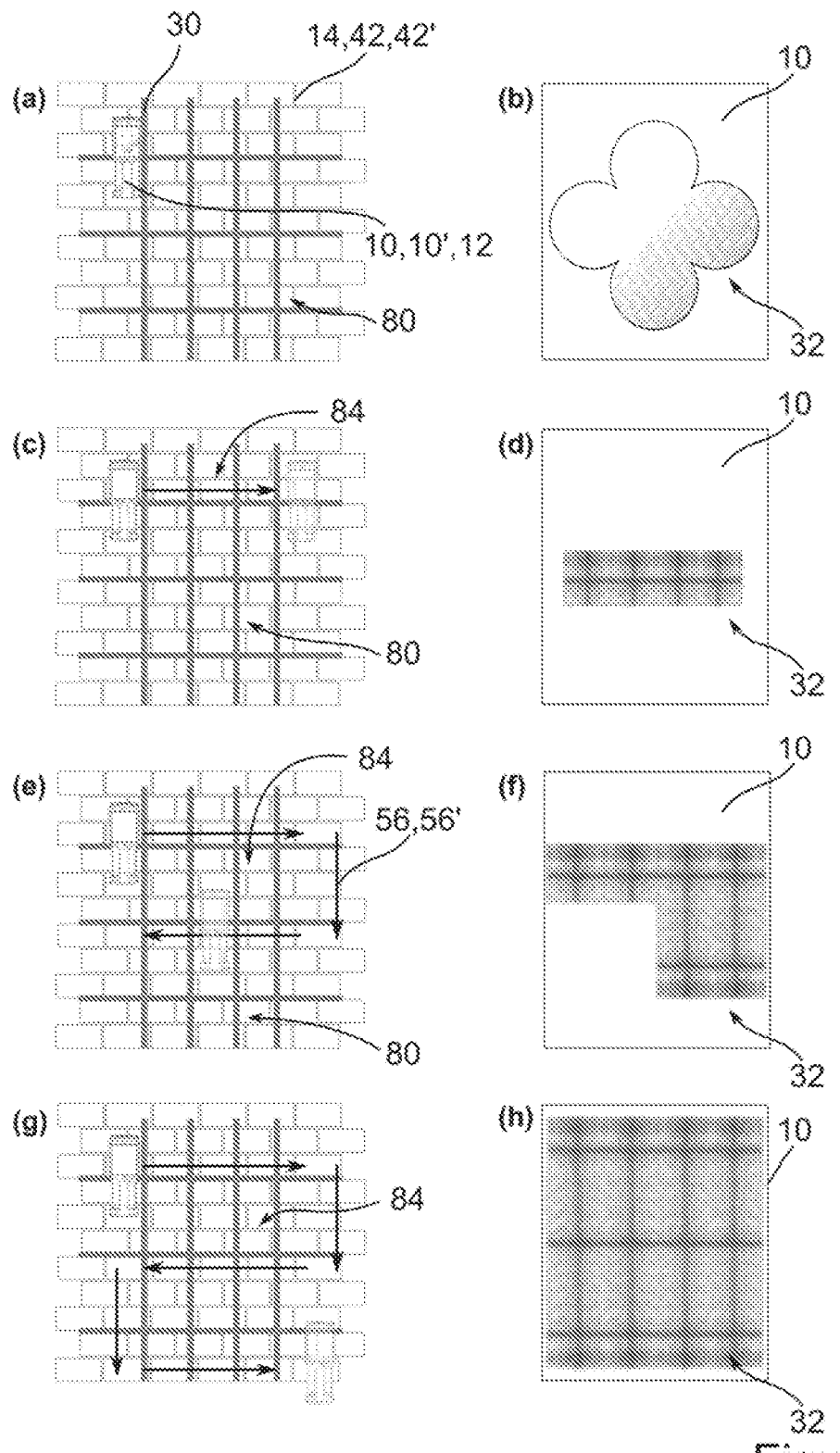

Furthermore, the evaluation apparatus 24 is provided, in a second mode of operation, to determine and provide an at least three-dimensional locating information item from the locating data and the position data by assigning locating data to position data (cf., in particular, also FIGS. 4b-c and FIG. 8). An at least two-dimensional map information item 32 may be determined and provided, in particular determined and provided in real time, from this at least three-dimensional locating information item by way of the evaluation apparatus 24.

The at least two-dimensional map information item 32 is embodied as a set of fields (pixels) not depicted in any more detail, which has a matrix structure with components arranged in lines and columns. Here, a component of the matrix corresponds to a field of the map information item. Each output value of the locating device 12 is assigned to at least one field. A field position is set by a map coordinate pair which has a map x-value and a map y-value. The evaluation apparatus 24 is provided to respectively assign the locating data to at least one field of the map information item on the basis of the link with the position data from the position sensor 40. Hence, the evaluation apparatus 24 assigns the locating data of the locating sensor 28 directly to fields of the two-dimensional map information item 32 by means of the position data from the position sensor 40. It is conceivable for the evaluation apparatus 24 to assign the locating data to precisely one field or to a plurality of fields. It is also conceivable for a plurality of locating data to be assigned to one field and for the evaluation apparatus 24 to weight the locating data to this end. In principle, various expedient weighting factors may be applied and the weighting factors may be embodied dependent on the position data. In one operating state, the evaluation apparatus 24 matches an assignment of locating data to fields of a data density and, in particular, refines the assignment, and hence a spatial resolution, and improves the map information item 32. During a locating process, in which the user passes over the examination surface 14 or a region of the examination surface 14 a number of times with the locating appliance 10' and hence with the locating sensor 28, there is an increase in a data density and the evaluation apparatus 24 refines the assignment of locating data to the fields of the map information item 32 and increases and/or refines a spatial resolution of the map information item 32. To this end, provision may be made for the evaluation apparatus 24 to check whether, for current locating data and position data, a corresponding data record with the same position coordinate pair is already present from a previous measurement, for example if it is present in the memory device 50. If this is the case, the evaluation apparatus 24 includes the locating data, in particular locating data read from the memory apparatus 50, in a calculation of the output values and, in the process, uses a weighting of the current locating data in relation to the already available data. As a matter of principle, different weighting factors may expediently be applied here.

In particular, the evaluation apparatus 24 is therefore provided to complement and/or update and/or refine and/or overwrite already determined and/or depicted locating information items, in particular at least two-dimensional map information items 32, when repositioning the locating apparatus 12, in particular when passing over a region of the examination surface 14 again. Advantageously, locating information items already determined in the first mode of operation, in particular at least two-dimensional map information items 32, may also be complemented and/or updated and/or refined and/or overwritten when repositioning the locating apparatus 12 in this manner as a consequence of displacing the locating appliance 10' and/or of passing over new regions 80 and/or of passing over already examined regions 84 of the examination surface 14 again. Hence, the evaluation apparatus 24 renders it possible to combine locating data and/or locating information items, in particular at least two-dimensional map information items 32, which are determined in the first mode of operation and in the second mode of operation. Consequently, there may likewise be a combined output to a user of the locating appliance 10'.

In the present exemplary embodiment, the output values of the at least two-dimensional map information item 32 have a color value of a continuous or quasi-continuous color scale. The evaluation apparatus 24 determines the color value for denoting regions which contain an object 30 to be located which is concealed under the examination surface 14. In particular, located objects 30 are depicted with different color values depending on the depth at which they are located under the examination surface 14.

The evaluation apparatus 24 is provided to determine and provide the map information item 32 in real time. During operation, the evaluation apparatus 24 respectively processes the data of the locating sensor 28 and of the position sensor 40 in series, in the sequence of the capture thereof by the locating sensor 28 and the position sensor 40. A processing rate may convey the impression to the user of the locating appliance 10' that locating data for a region 84 passed over by the locating sensor 28 are immediately assigned and provided as map information item 32. A data rate of locating data and position data, which are processed by the evaluation apparatus 24, is matched to a processing speed of the evaluation apparatus 24 in such a way that data which cannot be immediately processed by the evaluation apparatus 24 remain unconsidered.

The evaluation apparatus 24 is provided to interpolate and extrapolate the locating data and/or the locating information items in the two modes of operation of the locating system 10. The evaluation apparatus 24 is provided to provide an interpolated and extrapolated two-dimensional map information item 32, i.e. provide interpolation data or extrapolation data at least for some of the regions of the two-dimensional map information item 32, in particular for regions without locating data. Preferably, locating data of regions in a vicinity of a region without locating data are used to calculate interpolated or extrapolated locating information items. Hence, the evaluation apparatus 24 interpolates spatial locating data from a vicinity of a region to ascertain an interpolation value and to this end weight the locating data from a vicinity of the region. By means of interpolation and/or extrapolation, the evaluation apparatus 24 generates output values for regions in a vicinity of current position data. In particular, the regions of the map information item should also be understood to mean individual fields of the map information item processed in a matrix structure.

The evaluation apparatus 24 is provided to exclude, and in particular not display, at least some of the locating data and/or some of the locating information item when generating and/or modifying the map information item 32. To this end, the evaluation apparatus 24 is provided to compare locating data transmitted by the locating sensor to an expected value range, in particular to e.g. stored locating data and/or locating data which were already ascertained for adjacent regions or fields in relation to the examination surface 14. Therefore, it is possible to provide a value for a data quality using an evaluation prescription, for example depending on a deviation of the locating data from one another or depending on a comparison of the locating data with the value range to be expected. The evaluation prescription further takes into account data of the position sensor 40 and checks whether the locating data are able to be reliably assigned to position data. When generating and/or modifying the map information item 32, the evaluation apparatus 24 excludes locating data depending on the ascertained data quality and excludes locating data which are not reliably assignable to position data.

Furthermore, provision may be made for e.g. a contrast value, a grayscale value, a color value, a color saturation or a brightness of the depiction to depict an additional information item in respect of the carried-out locating process. In one embodiment, inaccurate or unreliable data may be marked in the two-dimensional map information item 32, for example by virtue of these being depicted using grayscale levels instead of color levels. Then, the user is able to assess which regions of the examination surface 14 need to be passed over another time with the locating appliance 10', in particular with the locating apparatus 12, in order to increase the quality and/or density of the data. Where necessary, the user passes over regions of the examination surface 14 another time or several more times and the locating system 10 complements, increases the density of and/or improves the two-dimensional map information item 32 and the display of the map information item 32. In particular, the locating system 10 increases and/or refines the spatial resolution of the map information item 32 and/or of the display apparatus 22.

Furthermore, the evaluation apparatus 24 is provided to output a warning signal depending on a displacement speed of the locating appliance 10', in particular of the locating apparatus 12, in relation to the examination surface 14. In particular, the warning signal is output if an accuracy and/or reliability of the locating data falls below a predetermined and/or predeterminable value on account of an excessively high acceleration and/or on account of a displacement speed of the locating appliance 10' that is too high. In the present exemplary embodiment, the locating system 10 has a signaling element not depicted in any more detail, which is connected to the evaluation apparatus 24 for transmitting the warning signal and which is provided to output the warning signal to the user. In the present exemplary embodiment, the signaling element is embodied as an acoustic signaling element. However, in principle, it is also conceivable for the signaling element to be embodied as an optical or tactile signaling element, for example a vibration element, or for said signaling element to be provided to output another expedient signal.

Furthermore, the evaluation apparatus 24 is provided to output a warning signal depending on the position data. During the operation, the evaluation apparatus 24 outputs a first warning signal if the position data are arranged in an edge region of the displayed portion. The edge region has a width of e.g. 10 percent of an overall extent of the displayed portion. In principle, the width may also have a different expedient value. Alternatively, or additionally, the evaluation apparatus 24 outputs a further warning signal, which differs in terms of its type from the first warning signal, if the current position data are arranged outside of the displayed portion. To this end, the locating appliance 10' uses the signaling element to output an acoustic signal.

Furthermore, it is conceivable for the evaluation apparatus 24 to be provided to provide to the user a direction information item which indicates the direction in which positions of the displayed portion lie relative to the current position data. The direction information item assists the user in guiding the locating appliance 10' in the region of the examination surface 14 corresponding to the displayed portion.

The display apparatus 22 is provided to vary the displayed portion of the map information item 32 depending on position data and/or depending on the mode of operation. In one operating state, the display apparatus 22 ascertains boundaries of a value range of captured position data for each coordinate value, i.e. a minimum and a maximum of the captured x-coordinate values and a minimum and a maximum of the captured y-coordinate values. The value range of captured position data changes dynamically on account of the movement of the locating appliance 10' over the examination surface 14. In the operating state, the displayed portion has a fixed imaging scale which specifies a ratio of the length of a path on the examination surface 14 to the length of an image of the path in the displayed portion. The display apparatus 22 shifts the displayed portion in one direction, which corresponds to a displacement direction (cf. path 56) of the locating appliance 10', and shows most recently captured and assigned locating data within the portion. The display apparatus 22 shifts the displayed portion if most recently captured position data are arranged in an edge region of the displayed portion.

In one operating state, the display apparatus 22 shifts the displayed portion dynamically and centers a position of the locating sensor in the displayed portion. In the case of a rotation or turn of the locating appliance 10' on the examination surface 14, the displayed portion of the map information item 32 is rotated counter to the direction of the rotational movement such that the displayed portion reproduces the objects 30 to be located which are located under the examination surface 14 true to position, and hence not rotated about the angle of rotation, even in the case of a rotation of the locating appliance 10'.

The display apparatus 22 is provided to scale the displayed portion of the map information item. The display apparatus 22 is provided to scale the displayed portion depending on the position data. The display apparatus 22 has an operating state in which the displayed portion comprises an entire region of captured position data. The display apparatus 22 adapts the scaling in the operating state, i.e. the display apparatus 22 reduces the imaging scale and the displayed portion corresponds to a larger region of the examination surface 14. By way of example, a change in scaling occurs between the map information items 32 depicted in FIGS. 8*b* and 8*d*.

In a further operating state, the display apparatus 22 has a time interval which restricts a set of position data used for determining the displayed portion. In the further operating state, only position data captured in the time interval starting from the current instant are considered for the value range. In a locating process in which the locating sensor 28 is arranged within a small region of the examination surface 14 in the time interval, the display apparatus 22 increases the imaging scale and the displayed portion corresponds to a smaller region of the examination surface 14. The display apparatus 22 increases and/or refines the resolution of the displayed portion and shows more details of a region of the examination surface 14 which corresponds to the displayed portion. By way of the extent of his displacement movement of the locating appliance 10', in particular of the locating apparatus 34, the user controls the resolution of the displayed portion.

The display apparatus 22 is provided to scale the depicted portion of the map information item 32 depending on a displacement speed. The display apparatus 22 has a calculation prescription which specifies how the imaging scale emerges from the displacement speed. In one operating state, the display apparatus 22 determines the imaging scale depending on the displacement speed. The display apparatus 22 determines a small imaging scale for a high displacement speed and a large imaging scale for a low displacement speed. Hence, the display apparatus 22 sets a large imaging scale for a low displacement speed and increases and/or refines the resolution of the depicted portion and shows more details of a region of the examination surface 14 which corresponds to the displayed portion. By way of the displacement speed of the locating appliance 10', in particular of the locating apparatus 34, the user controls the resolution of the displayed portion.

In an alternative embodiment of the locating system 10, provision may furthermore be made for the locating system to have a further display apparatus 22' provided to project a map information item 32 onto the examination surface 14. To this end, the further display apparatus 22' may have a color-capable projector. Then, the locating system 10 is provided to assign a projection point of the projector or a plurality of projection points to the reference point or the plurality of reference points for the position sensor 40 on the basis of user inputs. Then, the evaluation apparatus 24 is provided to evaluate the assignment of the projection points to the reference points of the position sensor 40 for scaling and referencing the locating data in relation to the map information item 32 shown by the projector. In principle, it is conceivable that the locating system 10 has the further display apparatus 22' as the only display apparatus 22.

Furthermore, the locating appliance 10' is provided to provide data for modifying and/or evaluating the two-dimensional map depiction 32 in an external data appliance (not depicted in any more detail) or in an external application. In one exemplary embodiment, the external data appliance may be embodied as a mobile computing unit, for example as a smartphone or a portable computer. For the data transfer, the locating appliance 10' has a data communication interface 48 which is realized as a WLAN or Bluetooth interface in a preferred embodiment.

Figure 9:
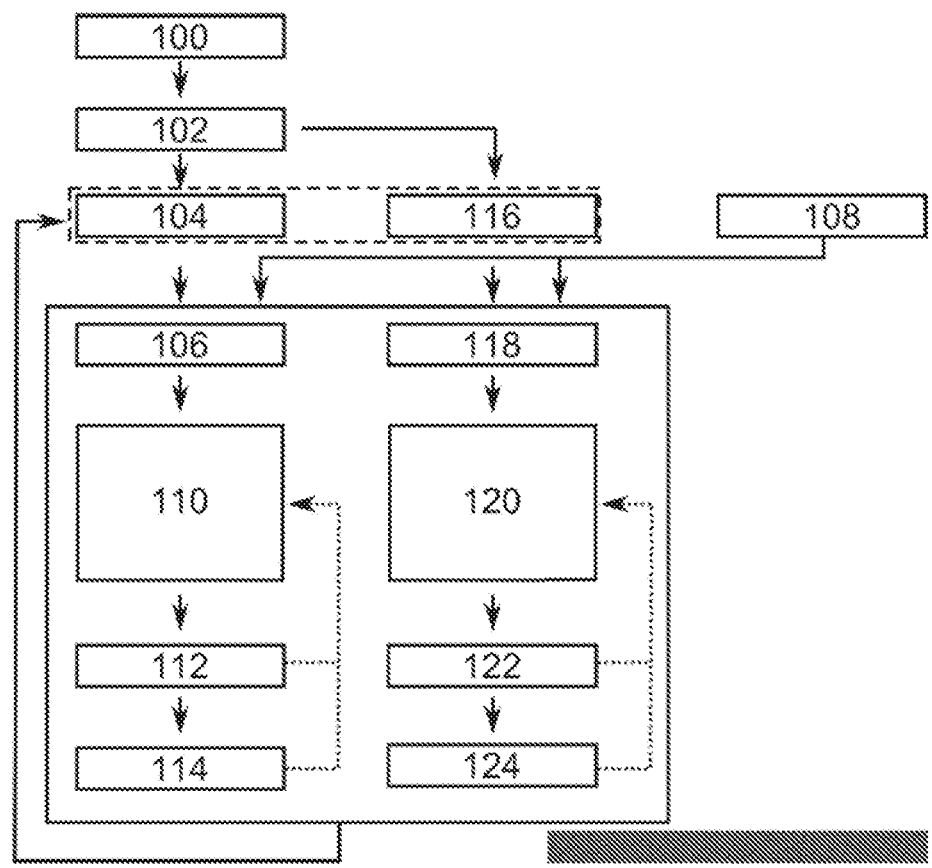
FIG. 9 shows an embodiment of a method according to the disclosure in a flowchart.

Below, the functionality and operation, in particular the method underlying the operation of the locating appliance 10', are explained in an exemplary scenario on the basis of FIGS. 8 and 9. In this scenario, a user of the locating appliance 10' wishes to examine a building wall 42' as a workpiece 42 in respect of concealed objects 30 to be located, in particular e.g. reinforcements. When the locating appliance 10' is switched on by means of an actuating element 18, the locating appliance 10' initially carries out a calibration of the functional components of the locating system 10 (method step 100). The calibration serves to put the functional components of the locating appliance 10' into operation, inter alia to read the internal memory apparatus 50, load operating routines, and initialize the locating sensor 28, the evaluation apparatus 24, the position sensor 40 and the placement identification apparatus 44. During this putting into operation, the locating appliance 10' is preferably situated freely in the air in the hand of the user, i.e., in particular, without contact with an examination surface 14. Subsequently, the locating appliance 10' is ready for use and in a waiting state, idle mode or detection state (method step 102).

With the appliance rear side 36 provided to this end, the user of the locating appliance 10' places the locating appliance 10' on any position on the examination surface to be examined of the wall 42'. In the process, the user lightly presses the locating appliance 10' against the wall 42' in such a way that inadvertent slipping and/or shaking of the locating appliance 10' on the wall 42' is avoided. The placement identification apparatus of the locating appliance 10' detects or identifies the placement of the locating appliance 10' on the examination surface 14 in method step 104 and forwards this information item to the control apparatus 26 of the locating appliance 10'. As a consequence of identifying a placement of the locating apparatus 12 on the examination surface 14 by means of the placement identification apparatus 44, the control apparatus 26 thereupon initiates an automatic switch of the locating appliance 10' into the first mode of operation in method step 106. From now on, the locating appliance 10' is readied for operation and, in particular, ready to determine and display, in the first mode of operation, a direction-resolved and/or spatially resolved locating information item from the locating data of the locating sensor without repositioning the locating appliance 10', in particular the locating apparatus 12, in relation to the examination surface 14.

In order to change or influence the selection of the first mode of operation carried out automatically in an appliance-internal manner, the user of the locating appliance 10' is also able at all times to manually select a mode of operation of the locating system 10 to be used (method step 108). In particular, this is carried out by selecting a mode of operation by means of the input apparatus of the locating appliance 10'. The automatically carried-out selection of one of the modes of operation is overwritten in this way.

As soon as the locating appliance 10' is in the first mode of operation, the direction-resolving and/or spatially resolving locating sensor 28 of the locating apparatus 12 continuously carries out a locating process in a predeterminable, in particular selectable or adjustable, detection zone 52 (method step 110, FIG. 8*a*). In this exemplary embodiment, the locating sensor 28 is realized as a transmission and reception apparatus 58 with at least one LCR antenna 54 which, as an electrically alignable locating sensor 28, is provided to facilitate a direction-resolving and/or spatially resolving locating process in the detection zone 52 (cf. FIGS. 5*a,b*). Hence, in method step 110, a direction-resolving and/or spatially resolving locating information item is determined from the locating data without repositioning the locating apparatus 12 in relation to the examination surface 14 and provided to the evaluation apparatus 24 in the first mode of operation of the locating system 10 (method step 110).

The evaluation apparatus 24 receives the locating data from the locating apparatus 12 and determines a direction-resolved and/or spatially resolved locating information item in the first mode of operation of the locating system 10 on the basis of the locating data captured by the direction-resolving and/or spatially resolving locating sensor 28. Preferably, the evaluation apparatus 24 determines an at least two-dimensional map information item 32, in particular a map, from the direction-resolved and/or spatially resolved locating data in the first mode of operation of the locating system 10 (FIG. 8*b*, cf., also, FIGS. 6*a-c* and 7).

Further, when necessary, the evaluation apparatus 24 carries out an interpolation and/or extrapolation and/or weighting of the locating data and in this manner generates high quality evaluated locating information items. Subsequently, the evaluation apparatus 24 transfers the locating information item, in particular the map information item 32, in an appliance-internal manner to the display apparatus 22 and/or the data communication interface 48 and/or the memory apparatus 50 for further use. The evaluation steps are combined in method step 112.

The display apparatus 22 serves to depict the locating information items and, in particular, is provided to depict an at least two-dimensional map information item 32, preferably a map (FIG. 8*b*, cf., also, FIGS. 6*a-c*, 7). In particular, the display apparatus 22 is provided to depict direction-resolved and/or spatially resolved locating information items determined using the first mode of operation as an at least two-dimensional map information item 32. The display apparatus 22 checks the displayed portion and the scaling of the portion and accordingly adapts the portion and/or the scaling of the portion. The display apparatus 22 then displays the prepared portion of the map information item 32. All relevant, required or expedient method steps in conjunction with depicting the locating information item are combined in method step 114.

In this way, the user obtains a direction-resolved and/or spatially resolved locating information item which was determined without repositioning the locating apparatus in relation to the examination surface 14. An intuitive and simple interpretation of the depicted locating information item is possible. In particular, the user of the locating appliance 10' may already identify whether a concealed object 30 to be located is situated directly under the locating sensor 28 of the locating appliance 10' on the basis of a preferably depicted map information item 32 (cf. FIG. 8*b*). This information item is required if, for example, a hole is intended to be drilled at precisely this position (center point of the locating sensor 28).

Furthermore, the user may gather the direction in which an object 30 to be located is concealed in relation to the locating sensor 28—and hence also in relation to the examination surface 14—from the depicted direction-resolved and/or spatially resolved map information item 32. In the example of an at least two-dimensional map information item 32 depicted in FIG. 8*b*, at least one concealed object 30 to be located is situated toward the right and downward, depicted by a colored designation in the output map information item 32 (in this case: hatching). Consequently, the user is able to identify regions of the examination surface 14 of interest on the basis of the map information item 32.

Preferably, the evaluation apparatus 24 determines the map information item 32 in real time such that a time-resolved depiction of the map information item 32 by means of the display apparatus 22 is possible. Hence, locating of time-variable objects to be located is possible in a time-resolved manner. By way of example, the changing map information item 32 allows observation of how an object 30 to be located moves through the detection zone 52 of the locating sensor 28. A processing rate may convey the impression to the user that locating data are provided immediately as map information item 32 without substantial time delay.

If the user is interested in further information items in respect of the objects 30 to be located concealed under the examination surface 14, he moves the locating appliance 10' with the locating sensor 28 and the position sensor 40 over the examination surface 14 (FIGS. 8*c,e,g*) by means of a movement, preferably a free movement. The control apparatus 26 of the locating appliance 10' identifies the change in position of the locating apparatus 12 in relation to the examination surface 14 on the basis of the position data provided by the position sensor 40. A sensitivity for identifying the change in position is predeterminable, in particular selectable or adjustable, for the locating appliance 10' by the user of the locating appliance 10'. As a consequence of identifying the change in position in method step 116, the control apparatus 26 puts the locating system 10 into the second mode of operation (method step 118).

In the second mode of operation, the locating sensor 28 captures locating data of the objects 30 to be located. The locating sensor 28 transmits the locating data to the evaluation apparatus 24 (method step 120). At the same time, the position sensor 40 captures position data (method step 120). The position sensor 40 likewise transmits the position data to the evaluation apparatus 24. The evaluation apparatus 24 is provided, in the second mode of operation, to determine and provide an at least three-dimensional locating information item from the locating data and the position data by assigning locating data to position data (method step 122). To this end, the evaluation apparatus 24 assigns locating data to the position data. From the obtained at least three-dimensional locating information item, the evaluation apparatus 24 further determines an at least two-dimensional map information item 32, preferably a two-dimensional map, in the second mode of operation of the locating system 10. The at least two-dimensional map information item 32 is preferably determined in real time. Furthermore, where necessary, the evaluation apparatus 24 carries out an interpolation and/or extrapolation and/or a weighting of the locating data and generates evaluated locating information items in this manner. The evaluation apparatus 24 subsequently transmits the locating information, in particular the map information item 32, in an appliance-internal manner to the display apparatus 22 and/or to the data communication interface 48 and/or the memory apparatus 50 for further use or storage. The locating and evaluation steps in the second mode of operation are combined in method steps 120 and 122, which may be run through sequentially in an iterative manner (depicted by a dashed arrow).

Within the scope of the evaluation, the evaluation apparatus 24 may store locating data, position data and, where necessary, further data in the storage apparatus 50. In particular, the evaluation apparatus 24 may also recall previously captured locating data and data, which were assigned to positions in a vicinity of the current position of the locating sensor, from the memory apparatus 50. The recalled locating data and/or locating information items may be used for an improved evaluation. Various evaluation routines are conceivable which, in particular, are based on a comparison of locating data such as, in particular, interpolation, extrapolation and/or weighting of locating data. The evaluation apparatus 24 provides an interpolated and/or extrapolated two-dimensional map information item 32, i.e. locating information items are provided by means of interpolation or extrapolation routines for at least some of the regions of the two-dimensional map information item 32 for which no locating data were previously available. To this end, locating data of regions of the map information item in a vicinity of the region without locating data are preferably used to calculate interpolated or extrapolated locating information items of the region. Hence, the evaluation apparatus 24 spatially interpolates locating data from a vicinity of a region for the purposes of ascertaining an interpolation value and, to this end, weights the locating data from a vicinity of the region (method step 122). In particular, the regions of the map information item should also be understood to mean individual fields of the map information item processed in a matrix structure.

A data density increases during a locating process in which the user passes over the examination surface 14 or a region of the examination surface 14 a number of times with the locating appliance 10' and, in particular, with the locating sensor 28, and the evaluation apparatus 24 refines the assignment of locating data to the regions of the map information item 32 and increases and/or refines the spatial resolution of the map information item 32. To this end, provision is made for the evaluation apparatus 24 to check whether a corresponding data record with the same position coordinate pair is already present from a preceding measurement, in particular present in the memory apparatus 50, for current locating data and position data. If this is the case, the evaluation apparatus 24 includes the locating data in a calculation of the output values and, in the process, uses a weighting of the current locating data in relation to the already available data (method step 122).

In particular, the evaluation apparatus 24 thus complements and/or updates and/or refines and/or overwrites already determined and/or depicted locating information items when repositioning the locating apparatus 12, in particular when passing over a region of the examination surface 14 again. Advantageously, locating information items already determined in the first mode of operation are also complemented and/or updated and/or refined and/or overwritten in this manner during a repositioning of the locating apparatus 12 as a consequence of displacing the locating appliance 10' and/or of passing over new regions 80 and/or passing over already examined regions 84 of the examination surface 14 again. The evaluation apparatus 24 renders it possible to combine locating data and/or locating information items which are determined in the first mode of operation and in the second mode of operation. Consequently, there may likewise be a combined output to a user of the locating appliance 10'.

The depiction, i.e., in particular, the evaluation and display of the at least two-dimensional map information item 32, is carried out in real time. During operation, the evaluation apparatus 24 in each case processes the data of the locating sensor 28 and of the position sensor in series in the sequence of the capture thereof by the locating sensor 28 and the position sensor 40. A processing rate conveys the impression to the user that locating data for a region 84 over which the locating sensor 28 is passed are immediately assigned and provided as a map information item. A data rate, processed by the evaluation apparatus 24, of locating data and position data is matched to a processing speed of the evaluation apparatus 24, i.e. data which cannot be processed immediately by the evaluation apparatus 24 remain unconsidered (method step 122).

The evaluation apparatus 24 is provided to exclude and, in particular, not display at least some of the locating data and/or some of the locating information item when generating and/or modifying the map information item 32. To this end, the evaluation apparatus 24 is provided to compare locating data transmitted by the locating sensor 28 with an expected value range, in particular e.g. with stored locating data and/or with locating data which were already ascertained for adjacent regions in relation to the examination surface 14. Hence, a value for a data quality may be provided using an evaluation prescription, for example depending on a deviation of the locating data from one another or depending on a comparison of the locating data with the value range to be expected. Furthermore, the evaluation prescription takes into account data of the position sensor 40 and checks whether the locating data may be reliably assigned to position data. The evaluation apparatus 24 excludes locating data depending on the ascertained data quality and excludes locating data, which are not reliably assignable to position data, when generating and/or modifying the map information item 32 (method step 122).

Subsequently, the evaluation apparatus 24 transmits the locating information item, in particular the map information item 32, to the display apparatus 22. The display apparatus 22 checks the displayed portion and the scaling of the portion and adapts the portion and/or the scaling of the portion. The display apparatus 22 is provided to depict locating information items determined using the second mode of operation, in particular three-dimensional locating information items, as an at least two-dimensional map information item 32 (method step 124). The user interprets the map information item 32, identifies an arrangement of the objects 30 to be located on the basis of the modified map information item 32 and/or identifies regions 80/84 of the examination surface 14 for which the map information item is inadequate and continues the locating process for these regions 80/84. The evaluation apparatus 24 completes and improves the map information item 32 over the course of the locating process. The evaluation apparatus 24 adapts a spatial resolution of the locating data in relation to an assignment to position data for the map information item 32. The display apparatus adapts a spatial resolution in relation to the displayed portion.

It should be noted that the disclosure is not restricted to the use of an antenna, in particular a radar antenna or an LCR antenna. In principle, for the purposes of locating the objects to be located which are concealed under an examination surface, the locating appliance may also be realized with other locating sensors, in particular locating sensors based on different measurement methods, for example with at least an inductive sensor, an AC sensor, a capacitive sensor, a 50 Hz sensor, a microwave sensor, a terahertz sensor, an ultrahigh frequency sensor, an x-ray sensor, an infrared sensor or an NMR sensor.

The invention claimed is:

1. A locating system having at least two selectable modes of operation including a first mode of operation and a second mode of operation, the locating system comprising:
   a hand-held locating apparatus configured to capture locating data in relation to objects concealed under an examination surface;
   a position sensor configured to capture position data of the locating apparatus in relation to the examination surface;
   a display; and
   an evaluation apparatus configured to:
      determine locating information items based on the locating data, the determined locating information items being:
         while in the first mode of operation, at least one of direction-resolved and spatially-resolved with respect to the locating apparatus and determined based on the locating data without repositioning the locating apparatus in relation to the examination surface; and
         while in the second mode of operation, at least three-dimensional, position-resolved with respect to the examination surface, and determined based on the locating data and the position data by assigning the locating data to the position data;
      determine a two-dimensional map information item based on the locating information items; and
      operate the display to depict the two-dimensional map information items, at least one of (i) a scaling of the two-dimensional map information item and (ii) a displayed portion of the two-dimensional map information item being varied depending on whether the locating system is operating in the first mode of operation or the second mode of operation.

2. The locating system as claimed in claim 1, wherein the hand-held locating apparatus is configured to capture locating data in an at least one of a direction-resolved and spatially resolved manner in relation to the objects concealed under the examination surface.

3. The locating system as claimed in claim 1, the hand-held locating apparatus further comprising:
   at least one locating sensor configured to be at least one of direction-resolving and spatially resolving in a detection zone.

4. The locating system as claimed in claim 3, wherein the at least one locating sensor of the hand-held locating apparatus is embodied as at least one of an electrically swivelable locating sensor, a mechanically swivelable locating sensor, an electrically alignable locating sensor, an array of locating sensors, and an imaging locating sensor.

5. The locating system as claimed in claim 3, wherein the at least one locating sensor of the hand-held locating apparatus has at least one of a predeterminable detection zone, a selectable detection zone, and an adjustable detection zone.

6. The locating system as claimed in claim 3, wherein the evaluation apparatus is configured, in the first mode of operation of the locating system, to determine the at least one of direction-resolved and spatially resolved locating information item based on locating data captured by the at least one locating sensor.

7. The locating system as claimed in claim 1, wherein the evaluation apparatus is configured, in the second mode of operation of the locating system, to determine, in real time, an at least two-dimensional map information item from the at least three-dimensional locating information item.

8. The locating system as claimed in claim 1, wherein the evaluation apparatus is configured, in the first mode of operation and in the second mode of operation, to combine determined locating information items.

9. The locating system as claimed in claim 8, wherein the evaluation apparatus is configured to at least one of complement, update, refine, and overwrite already determined locating information items when passing over a region of the examination surface again.

10. The locating system as claimed in claim 9, wherein the evaluation apparatus is configured to at least one of complement, update, refine, and overwrite locating information items already determined in the first mode of operation when passing over a region of the examination surface again.

11. The locating system as claimed in claim 1, wherein the evaluation apparatus is configured, in at least one of the first mode of operation and in the second mode of operation, to at least one of interpolate and extrapolate at least one of the locating data and the locating information items.

12. The locating system as claimed in claim 1, wherein the first and second modes of operation of the locating system are manually selectable.

13. The locating system as claimed in claim 1, further comprising:
   a control apparatus configured to select a the first and second modes of operation automatically and automatically switch between the first and second modes of operation.

14. The locating system as claimed in claim 13, wherein the control apparatus is configured to switch into the second mode of operation when a change in position of the locating apparatus in relation to the examination surface is identified,
   wherein a sensitivity of the identification of a change in position is at least one of predeterminable, selectable, and adjustable.

15. The locating system as claimed in claim 1, the hand-held locating apparatus further comprising:
   a placement identification apparatus configured to detect at least one of a placement of the locating apparatus onto the examination surface and a removal of the locating apparatus from the examination surface.

16. The locating system as claimed in claim 15, further comprising:
   a control apparatus configured to activate the first mode of operation when a placement of the locating apparatus onto an examination surface is identified by the placement identification apparatus.

17. The locating system as claimed in claim 1, wherein at least one of the display apparatus and the evaluation apparatus is configured to exclude at least some of the locating information item when at least one of generating and modifying the two-dimensional map information item.

18. A method for locating objects concealed under an examination surface with a locating system having at least two selectable modes of operation including a first mode of operation and a second mode of operation, the method comprising:

determining, with an evaluation apparatus of the locating system, locating information items based on the locating data, the determined locating information items being:
  while in the first mode of operation, at least one of direction-resolved and spatially-resolved with respect to a locating apparatus of the locating system and determined based on locating data of the locating apparatus without repositioning the locating apparatus in relation to the examination surface; and
  while in the second mode of operation, at least three-dimensional, position-resolved with respect to the examination surface, and determined by assigning the locating data to position data of a position sensor of the locating system;
determining, with the evaluation apparatus, a two-dimensional map information item based on the locating information items; and
depicting, with a display of the locating system, the two-dimensional map information items, at least one of (i) a scaling of the two-dimensional map information item and (ii) a displayed portion of the two-dimensional map information item being varied depending on whether the locating system is operating in the first mode of operation or the second mode of operation.

* * * * *